United States Patent
Olabi et al.

(10) Patent No.: US 11,996,238 B2
(45) Date of Patent: May 28, 2024

(54) NITRIDATION-INDUCED IN SITU COUPLING OF Ni-CO$_4$N PARTICLES IN NITROGEN-DOPED CARBON NANOSHEETS FOR HYBRID SUPERCAPACITORS

(71) Applicant: University of Sharjah, Sharjah (AE)

(72) Inventors: Abdul Ghani Olabi, Sharjah (AE); Mohammad Abdelkareem, Sharjah (AE); Pragati Ankush Shinde, Sharjah (AE); Nilesh R. Chodankar, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 17/582,088

(22) Filed: Jan. 24, 2022

(65) Prior Publication Data
US 2023/0238189 A1  Jul. 27, 2023

(51) Int. Cl.
*H01G 11/86* (2013.01)
*H01G 11/34* (2013.01)
*H01G 11/56* (2013.01)

(52) U.S. Cl.
CPC ............ *H01G 11/86* (2013.01); *H01G 11/34* (2013.01); *H01G 11/56* (2013.01)

(58) Field of Classification Search
CPC ......... H01G 11/35; H01G 11/56; H01G 11/86
USPC ...................................... 427/79–81, 113, 123
See application file for complete search history.

(56) References Cited

U.S. PATENT DOCUMENTS

| | | | | |
|---|---|---|---|---|
| 10,141,123 | B2 * | 11/2018 | Kumar | H01G 11/86 |
| 11,557,441 | B2 * | 1/2023 | Pinault | H01G 11/06 |
| 2007/0108068 | A1 * | 5/2007 | Suh | H01G 11/34 |
| | | | | 205/766 |
| 2014/0087192 | A1 * | 3/2014 | Lai | H01G 11/48 |
| | | | | 428/688 |

(Continued)

OTHER PUBLICATIONS

Carbon Nanocoil-supported three-dimensional structure of Nickel-Cobalt Nitrides as the electrode Material for Supercapacitors, Applied Energy Materials, Sammed et al. 2021 vol. 4 pp. 6678-6687 (Year: 2021).*

(Continued)

*Primary Examiner* — Brian K Talbot
(74) *Attorney, Agent, or Firm* — MH2 TECHNOLOGY LAW GROUP, LLP

(57) ABSTRACT

There is disclosed a process of producing a hybrid super-capacitor (HSC) electrode, the process comprising performing nitridation-induced in situ coupling of Ni—Co$_4$N nanoparticles in an N-doped carbon matrix, wherein the resultant hybrid super-capacitor (HSC) electrode is a Ni—Co$_4$N@NC electrode. The resultant hybrid super-capacitor (HSC) electrode is a self-supported metal nitride coordinated with N-doped carbon, wherein the nitridation-induced in situ coupling is performed via a facile pyrolysis of layered Ni—Co hydroxide decorated on polyaniline (PANI) nanotubes on the basis of a carbon cloth (CC). Also disclosed is a hybrid supercapacitor cell assembled by employing Ni—Co$_4$N-2@NC as a positive electrode and AC as a negative electrode with a PVA (poly vinyl alcohol)/KOH as a gel electrolyte.

10 Claims, 16 Drawing Sheets

(56) References Cited

U.S. PATENT DOCUMENTS

2021/0171350 A1* 6/2021 Aubert .................. H01G 11/36
2022/0246363 A1* 8/2022 Losic .................... H01G 11/06

OTHER PUBLICATIONS

Ni-doped Cobalt-Cobalt Nitride Hereostructures Arrays for High Power Supercapacitors—ACS Energy Letters—2018—vol. 3, pp. 2462-2469 (Year: 2018).*
Dong et al., "Carbon materials for high mass-loading supercapacitors: filling the gap between new materials and practical applications", Journal of Materials Chemistry A, 2008, vol. 8, Issue 21930, 17 pages.
Wang et al., "Transition metal nitrides for electrochemical energy applications", Chem Soc Rev., 2021, Issue 2, pp. 1354-1390, 37 pages.
Zhu et al., "A New View of Supercapacitors: Integrated Supercapacitors", AdvancedEnergyMaterials, Wiley online library, Sep. 26, 2019, vol. 9, Issue 36, 11 pages.
Wen et al., "Wearable technologies enable high-performance textile supercapacitors with flexible, breathable and wearable characteristics for future energy storage", Elsevier, Energy Storage Materials, Science Direct, 2021, vol. 37, pp. 94-122, 29 pages.
Sun et al., "One-Dimensional Nanostructured Pseudocapacitive Materials: Design, Synthesis and Applications in Supercapacitors", Batteries & Supercaps, vol. 2, Issue 10, Oct. 2019, pp. 820-841, 22 pages.
Liu et al., "Transition metal based battery-type electrodes in hybrid supercapacitors: A review", Elsevier, Energy Storage Materials, ScienceDirect, 2020, vol. 28, pp. 122-145, 24 pages.
Yin et al., "Hierarchical core-shell structure of NiCo2O4 nanosheets@HfC nanowires networks for high performance flexible solid-state hybrid supercapacitor", Elsevier, Chemical Engineering Journal, ScienceDirect, 2020, vol. 392, Issue 124820, 11 pages.
Tan et al, "Negative electrode materials of molybdenum nitride/N-doped carbon nano-fiber via electrospinning method for high-performance supercapacitors", Elsevier, Electrochimica Acta, ScienceDirect, 2018, vol. 277, pp. 41-49, 9 pages.
Shinde et al., "All-redox solid-state supercapacitor with cobalt manganese oxide@bimetallic hydroxides and vanadium nitride@nitrogen-doped carbon electrodes", Elsevier, Chemical Engineering Journal, ScienceDirect, 2021, vol. 405, Issue 127029, 13 pages.
Zheng et al., "All-solid-state high-energy planar asymmetric supercapacitors based on all-in-one monolithic film using boron nitride nanosheets as separator", Elsevier, Energy Storage Materials, ScienceDirect, 2018, vol. 10, pp. 24-31, 8 pages.
Shinde et al., "Hierarchically designed 3D Cu 3 N@Ni 3 N porous nanorod arrays: An efficient and robust electrode for high-energy solid-state hybrid supercapacitors", Elsevier, Applied Materials Today, ScienceDirect, 2021, vol. 22, Issue 100951, 11 pages.
Dong et al., "Nanostructured transition metal nitrides for energy storage and fuel cells", ELSEVIER, Coordination Chemstry Reviews, SciVerse ScienceDirect, 2013, vol. 257, pp. 1946-1956, 11 pages.
Ray et al., "Conceptual design of three-dimensional CoN/Ni3N-coupled nanograsses integrated on N-doped carbon to serve as efficient and robust water splitting electrocatalysts", Journal of Materials Chemistry A, vol. 6, Issue 4466, 1028, 11 pages.
Muhammad-Sadeeq Balogun et al., "Three-dimensional nickel nitride (Ni3N) nanosheets: free standing and flexible electrodes for lithium ion batteries and supercapacitors", Journal of Materials Chemistry A, vol. 4, Issue 9844, 2016, 6 pages.
Liu et al., "Ni-Doped Cobalt-Cobalt Nitride Heterostructure Arrays for High-Power Supercapacitors", ACS Energy Letters, vol. 3, pp. 2462-2469, 2018, 8 pages.
Choi et al., "Fast and Reversible Surface Redox Reaction in Nanocrystalline Vanadium Nitride Supercapacitors", Advanced Materials, Wiley-VCH Verlag GmbH & Co. KGaA, Weinheim, 2006, vol. 18, pp. 1178-1182, 5 pages.
Lee et al., "Single-Crystalline Mesoporous Molybdenum Nitride Nanowires with Improved Electrochemical Properties", Journal of the American Ceramic Society, Jan. 2013, vol. 96, Issue 1, pp. 37-39, 3 pages.
Wang et al., "Modified Co4N by B-doping for high-performance hybrid supercapacitors", Nanoscale, Royal Society of Chemistry, 2020, vol. 12, Issue 18400, 9 pages.
Wang et al., "Binder-Free Co4N Nanoarray on Carbon Cloth as Flexible High-Performance Anode for Lithium-Ion Batteries", ACS Applied Energy Materials, 2018, vol. 1, pp. 4432-4439, 8 pages.
Lai et al., "Co—N-Codoped Carbon/Co@Carbon Cloth Hybrid Derived from ZIF-67 for the Oxygen Evolution Reaction and Supercapacitors", energy&fuels, 2020, vol. 34, pp. 13023-13031, 9 pages.
Shen et al., "NiCo 2 S 4 Nanosheets Grown on Nitrogen-Doped Carbon Foams as an Advanced Electrode for Supercapacitors", Advanced Energy Materials, Wiley-VCH Verlag GmbH & Co. KGaA, Weinheim, 2015, vol. 5, Issue 1400977, 7 pages.
Zhu et al., "Cobalt/titanium nitride@N-doped carbon hybrids for enhanced electrocatalytic hydrogen evolution and supercapacitance", NJC-New Journal of Chemistry, 2019, vol. 43, pp. 14518-14526, 9 pages.
B. Vaidhyanathan and K. J. Rao, "Synthesis of Ti, Ga, and V Nitrides: Microwave-Assisted Carbothermal Reduction and Nitridation", American Chemical Society, Chemical Materials, 1997, vol. 9, Issue No. 5, 5 pages.
He et al., "A new nanocomposite: Carbon cloth based polyaniline for anelectrochemical supercapacitor", Elsevier, Electrochimica Acta, 2013, vol. 111, pp. 210-215, 6 pages.
Wen et al., "Three-dimensional hierarchical NiCo hydroxide@Ni3S2 nanorod hybrid structure as high performance positive material for asymmetric supercapacitor". Elsevier, Electrochimica Acta, 2016, vol. 222, pp. 965-975, 11 pages.
Chen et al., "Metallic Co4N Porous Nanowire Arrays Activated by Surface Oxidation as Electrocatalysts for the Oxygen Evolution Reaction", Electrocatalysts, Angewandte Chemie, Wiley-VCH Verlag GmbH & Co. KGaA, Weinheim, 2015, vol. 127, pp. 14923-14927, 5 pages.
Zhu et al., "In Situ Coupling Strategy for the Preparation of FeCo Alloys and Co4N Hybrid for Highly Efficient Oxygen Evolution", Wiley Online Library, Advanced Materials, Dec. 20, 2017, vol. 29, Issue 47, 28 pages.
Wang et al., "Large scale synthesis and characterization of Ni nanoparticles by solution reduction method", Bulletin of Materials Science, Springer Link, 2008, vol. 31, Issue No. 1, pp. 97-100, 4 pages.
Grosvenor et al., "New interpretations of XPS spectra of nickel metal and oxides", Elsevier, Science Direct, Surface Science, 2006, vol. 600, pp. 1771-1779, 9 pages.
Li et al., "Co4N Nanowires: Noble-Metal-Free Peroxidase Mimetic with Excellent Salt- and Temperature-Resistant Abilities", ACS Applied Materials & Interfaces, American Chemical Society, 2017, vol. 9, pp. 29881-29888, 8 pages.
Kone et al., "In Situ Growth of Co4N Nanoparticles-Embedded Nitrogen-Doped Carbon Nanotubes on Metal-Organic Framework-Derived Carbon Composite as Highly Efficient Electrocatalyst for Oxygen Reduction and Evolution Reactions", Energy Technology, 2020, vol. 8, Issue 20000409, 11 pages.
Li et al., "CoO-modified Co4N as a heterostructured electrocatalyst for highly efficient overall water splitting in neutral media", Journal of Materials Chemistry A., Royal Society of Chemistry, 2018, vol. 6, Issue 24767, 6 pages.
Wang et al., "Functionalized N-doped interconnected carbon nanofibers as an anode material for sodium-ion storage with excellent performance", Elsevier, SciVerse ScienceDirect, 2013, vol. 55, pp. 328-334, 7 pages.
Kundu, et al., "Effect of Dimensionality and Doping in Quasi-"One-Dimensional (1-D)" Nitrogen-Doped Graphene Nanoribbons on the Oxygen Reduction Reaction", ACS Applied Materials & Interfaces, 2017, vol. 9, pp. 38409-38418, 10 pages.
Guo et al., "Active sites of nitrogen-doped carbon materials for oxygen reduction reaction clarified using model catalysts", Electrochemistry, 2016, vol. 351, Issue 6271, 5 pages.

(56) References Cited

OTHER PUBLICATIONS

Kong et al., "3D self-branched zinc-cobalt Oxide@N-doped carbon hollow nanowall arrays for high-performance asymmetric supercapacitors and oxygen electrocatalysis", Elsevier, Energy Storage Materials, 2019, vol. 23, pp. 653-663, 11 pages.

Orazem & Tribollet, "Electrochemical Impedance Spectroscopy", The Electrochemical Society Series, John Wiley & Sons, Inc., 2017, 44 pages.

Chodankar et al., "Potentiodynamic polarization assisted phosphorus-containing amorphous trimetal hydroxide nanofibers for highly efficient hybrid supercapacitors", Journal of Materials Chemistry A, Royal Society of Chemistry, 2020, vol. 8, Issue 5721, 13 pages.

Muhammad Sufyan Javed et al., "Tracking Pseudocapacitive Contribution to Superior Energy Storage of MnS Nanoparticles Grown on Carbon Textile", ACS Applied Materials & Interfaces, American Chemical Society, 2016, pp. 24621-24628, 8 pages.

Shinde et al., "Layered manganese metal-organic framework with high specific and areal capacitance for hybrid supercapacitors", Elsevier, Chemical Engineering Journal, 2020, vol. 387, Issue 122982, 11 pages.

Yan et al., "Understanding the fast lithium storage performance of hydrogenated $TiO_2$ nanoparticles", Journal of Materials Chemistry A, RSC Publishing, 2013, vol. 1, Issue 14507, 8 pages.

Yan et al., "Double-layered yolk-shell microspheres with $NiCo_2S_4$—$Ni_9S_8$-C hetero-interfaces as advanced battery-type electrode for hybrid supercapacitors", Elsevier, Chemical Engineering Journal, ScienceDirect, 2020, vol. 396, Issue 125316, 11 pages.

Mallick et al., "Rationally designed mesoporous carbon-supported Ni—$NiWO_4$@NiS nanostructure for the fabrication of hybrid supercapacitor of long-term cycling stability", Elsevier, Journal of Power Sources, 2020, vol. 477, Issue 229038, 9 pages.

Yu et al., "A novel $Ni_3N$/graphene nanocomposite as supercapacitor electrode material with high capacitance and energy density", Journal of Materials Chemistry A, Royal Society of Chemistry, 2015, vol. 3, pp. 16633-16641, 10 pages.

Ishaq et al., "Fluorinated graphene-supported Nickel-Cobalt-Iron nitride nanoparticles as a promising hybrid electrode for supercapacitor applications", Elsevier, Electrochimica Acta, ScienceDirect, 2018, vol. 282, pp. 913-922, 10 pages.

Chebrolu et al., "Selective Growth of Zn—Co—Se Nanostructures on Various Conductive Substrates for Asymmetric Flexible Hybrid Supercapacitor with Enhanced Performance", Adv. Mater. Technol., 2019, pp. 1-12.

Ouyang et al., "Three-Dimensional Hierarchical Structure ZnO@C@NiO on Carbon Cloth for Asymmetric Supercapacitor with Enhanced Cycle Stability", ACS Applied Materials & Interfaces, 2018, vol. 10, pp. 3549-3561, 13 pages.

\* cited by examiner

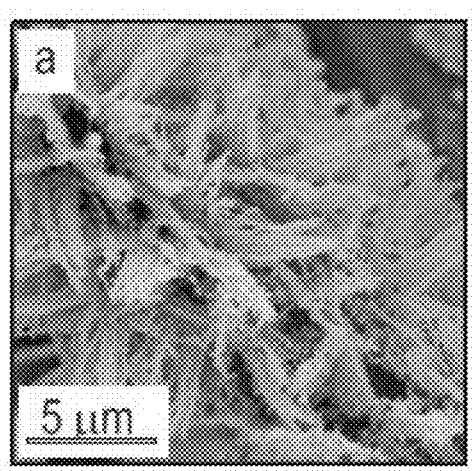
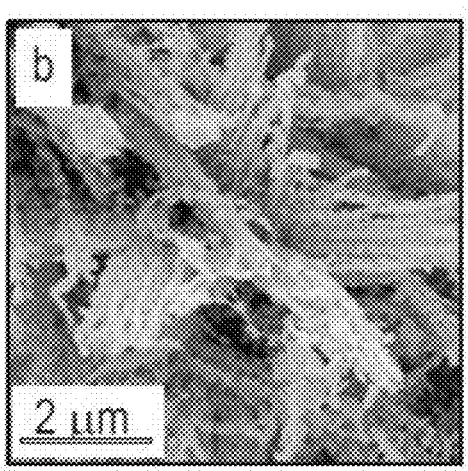
Fig 2A　　　　　　　　Fig 2B
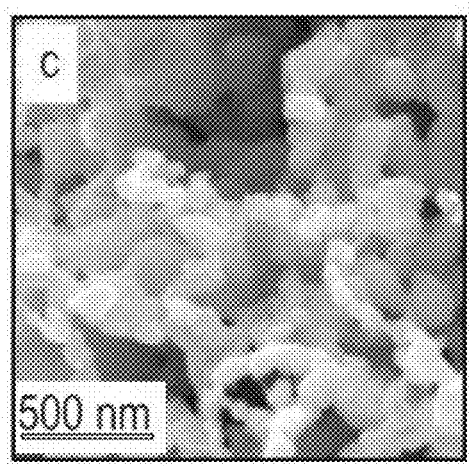
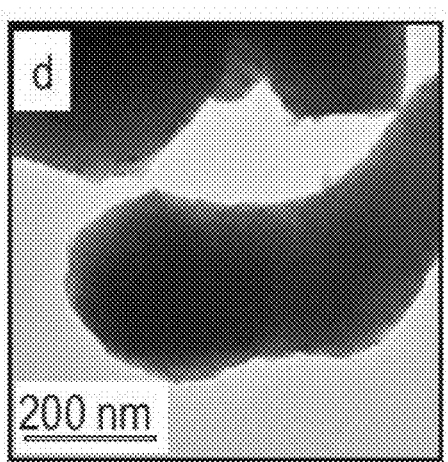
Fig 2C　　　　　　　　Fig 2D
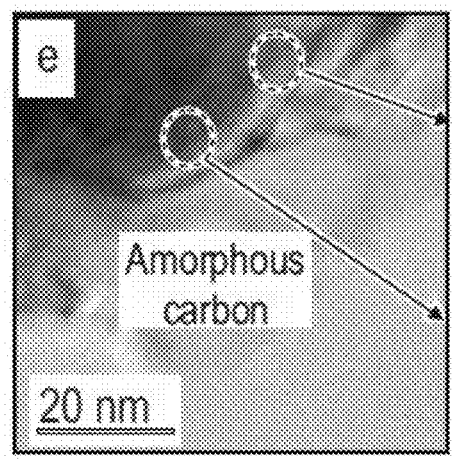
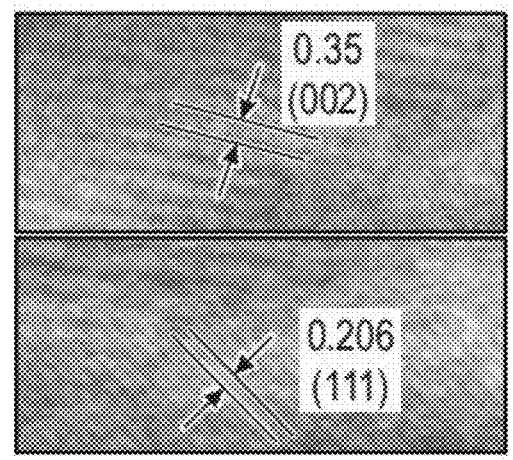
Fig 2E

NITRIDATION-INDUCED IN SITU COUPLING OF Ni-CO₄N PARTICLES IN NITROGEN-DOPED CARBON NANOSHEETS FOR HYBRID SUPERCAPACITORS

FIELD OF THE INVENTION

The present invention relates to a self-supported integrated structure of electrode consisting of heteroatoms, and more particularly the utilization of hetero-atomic self-supported metal nitrides for high energy hybrid supercapacitor (HSC) cells.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

There is no doubt that the global energy demand is increasing rapidly owing to the economic growth and increase in human population along with their reliance on energy-related gadgets. The past few decades have witnessed a rapid depletion in fossil fuels, making energy storage devices one of the hot topics in near future. In search of clean and highly efficient energy storage systems, hybrid supercapacitors (HSCs) have been found to be one of the best devices as a result of their ultrahigh power densities along with their stable cycling performance, cost-effectiveness, high efficiency and for being environment friendly. However, the surface controlled electrochemical reactions of supercapacitors restrict the charge transfer process on or near the surface leading to a relatively inferior energy storing capacity than the traditionally used Li-ion batteries (LIBs), which hamper their leading role for practical devices. The hybrid design of supercapacitors assembled with a redox active positive electrode and carbon composed negative electrode can be able to tackle the low energy density limit exclusive of surrendering power density and cycle life. Thus far it has been challenging to find an appropriate electrode material to boost the energy storage capacity of present supercapacitors, and bring the same close to that of LIBs.

Among transition metal-based electrodes, transition metal nitrides (TMNs) have also been employed as a promising class of electrode materials for LIBs, electro catalysis and supercapacitors in recent years. Particularly, TMNs possess several merits of active supercapacitors electrode including their almost metal-like electrical conductivity, novel electronic structure, excellent electrochemical activity, high specific capacity and high resistance to the corrosion. Notably, due to the presence of interstitial nitrogen in their electronic structure, TMNs facilitate quick electron transfer. In particular, $Ni_3N$, $Co_2N$, $VN$, $MoN$ etc. are explored to be superior electrode materials for supercapacitors. Recently, Cobalt nitride ($Co_4N$) grips huge potential as a novel material for supercapacitors because of the incorporation of nitrogen (N) atoms into the interstitial sites of cobalt unit cells (it offers high electrical conductivity, high intrinsic activity, stable performance).

Nevertheless, practical applications of $Co_4N$-based electrodes are imperfect due to their metastable properties—and to overcome this instability, carbon-based materials are generally used as a matrix to immobilize electrode as protective shells. Recently, N-doped carbon matrix has taken more interest owing to their excellent features including simple preparation, high electronic conductivity and being environment friendly. Interestingly, the carbon atoms from the carbon matrix are replaced with the doped N atoms and the charge transfer takes place between adjacent carbon atoms and doped N atoms, which enhances the conductivity and create more active sites for the electrochemical activity of the electrode. For example, Zhu et al. developed incorporated electrode with Co—TiN encapsulated in N-doped carbon which delivered capacitance of 189 mF $cm^{-2}$ at a current density of 0.5 mA $cm^{-2}$. The hetero-structured electrode with Ni-doped Co—$Co_2N$ nanosheets arrays were found to deliver maximum specific capacity of 361.93 C $g^{-1}$ at 2 mA $cm^{-2}$. Thus, the development towards the fabrication of an extremely pleasing yet self-supported metal nitrides coordinated with N-doped carbon with excellent energy storage capability is highly required however challenging too.

Therefore, there exists a need for self-supported metal nitrides coordinated with N-doped carbon which overcomes the drawbacks faced by traditionally implemented nanosheets or arrays.

SUMMARY OF THE INVENTION

Therefore it is an objective of the present invention to propose the utilization of hetero-atomic self-supported metal nitrides for high energy hybrid supercapacitor (HSC) cells, which overcomes the drawbacks faced by traditionally implemented nanosheets or arrays.

In an aspect of the invention, a process of producing a hybrid super-capacitor (HSC) electrode is proposed, the process comprising the steps of performing nitridation-induced in situ coupling of Ni—$Co_4N$ nanoparticles in an N-doped carbon matrix, wherein the resultant hybrid supercapacitor (HSC) electrode is a Ni—$Co_4N$@NC electrode.

In an embodiment of the present invention, the resultant hybrid super-capacitor (HSC) electrode is a self-supported metal nitride coordinated with N-doped carbon.

In another embodiment of the present invention, the nitridation-induced in situ coupling is performed via a facile pyrolysis of layered Ni—Co hydroxide decorated on polyaniline (PANI) nanotubes on the basis of a carbon cloth (CC).

In another embodiment of the present invention, nitrogenous gases released from the facile pyrolysis of polyaniline (PANI) nanotubes are used for the in-situ conversion of NiCo@PANI to Ni—$Co_4N$@NC.

In another embodiment of the present invention, the produced hybrid super-capacitor (HSC) electrode is constructed with Ni—$Co_4N$@NC and activated carbon (AC) as cathode and anode of the produced hybrid super-capacitor (HSC) electrode.

In another embodiment of the present invention, the cathode and anode demonstrate a specific energy of 57.2 Wh $kg^{-1}$ at a specific power of 843.8 W $kg^{-1}$ and capacity retention of 89.7% after 15,000 cycles.

In another embodiment of the present invention, synthesis of polyaniline (PANI) on carbon cloth (PANI/CC) is conducted through steps comprising using ammonium persulfate to polymerize aniline to form PANI on carbon cloth (CC), immersing clean CC in a 50 mL of mixture solution of 1 M H2SO4 and 0.55 mL aniline placed in an ice bath under magnetic stirring, adding 50 mL of 1 M H2SO4 containing 0.545 g ammonium persulfate dropwise to the mixture solution forming a reaction mixture; and placing the reaction mixture in the ice bath.

In another embodiment of the present invention, the reaction mixture is placed in the ice bath for 5 hours, and a subsequently obtained green color PANI deposited CC is washed with de-ionized (DI) water and acetone and dried overnight at 60° C. prior to further use.

In another embodiment of the present invention, preparation of Ni—Co4N@NC nanoparticles arrays on CC comprises the steps of growing PANI nanowires on a carbon cloth (CC) substrate through polymerization of aniline in a chilled environment resulting in PANI coated CC, growing NiCo precursor nanosheets on the PANI coated CC under a hydrothermal process, and calcinating the PANI coated CC in a tubular furnace under Ar/NH3 environment at 700° C.

In another embodiment of the present invention, formation of metal nitrides from the NiCo precursor nanosheets takes place inside the tubular furnace.

In another embodiment of the present invention, an SEM image of the prepared Ni—Co4N@NC nanoparticles arrays on CC reveals that the NiCo precursor nanosheets are assembled into uniformly oriented free-standing 1D nanorods and are perpendicularly anchored on the CC substrate, forming hierarchical arrays.

As another aspect of the present invention, a hybrid supercapacitor cell assembled by employing Ni—Co$_4$N-2@NC as a positive electrode and AC as a negative electrode with a PVA (poly vinyl alcohol)/KOH as a gel electrolyte, is proposed.

In an embodiment of the present invention, the PVA-KOH gel electrolyte is prepared by the steps comprising dissolving 6 g of PVA was dissolved in 30 ml of de-ionized (DI) water under heating at 80° C. with continuous stirring until formation of a transparent solution, cooling the transparent solution, and adding 20 mL of 1 M KOH aqueous solution into the cooled transparent solution under continuous stirring until formation of a viscous solution.

In another embodiment of the present invention, heteroatomic Ni—Co4N nanoparticles are laminated on a highly conductive nitrogen-doped carbon (NC) matrix on carbon cloth through in-situ nitridation.

In another embodiment of the present invention, Ni—Co4N@NC is used as a redox active material for supercapacitor cathode electrodes.

In another embodiment of the present invention, the hybrid super-capacitor cell is generated with hetero-atomic NiCo4N@NC nanoparticles on a Ni foam, and is used as positive material and activated carbon as negative electrode.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 2A shows the Ni—Co4N@NC nano-architecture firmly anchored on the surface of CC, in accordance with the present invention.

FIGS. 2B and 2C show high-magnification SEM images which reveal that the single nanorod is arranged with tiny, stacked nanoparticles, in accordance with the present invention.

FIG. 2D shows how ~200 nm nanoparticles are connected to form a stacked nanoparticles architecture, and that the nanoparticles are strongly interconnected to each other and surrounded by N-doped amorphous carbon matrix, as shown in FIG. 2E.

Figure 5A:
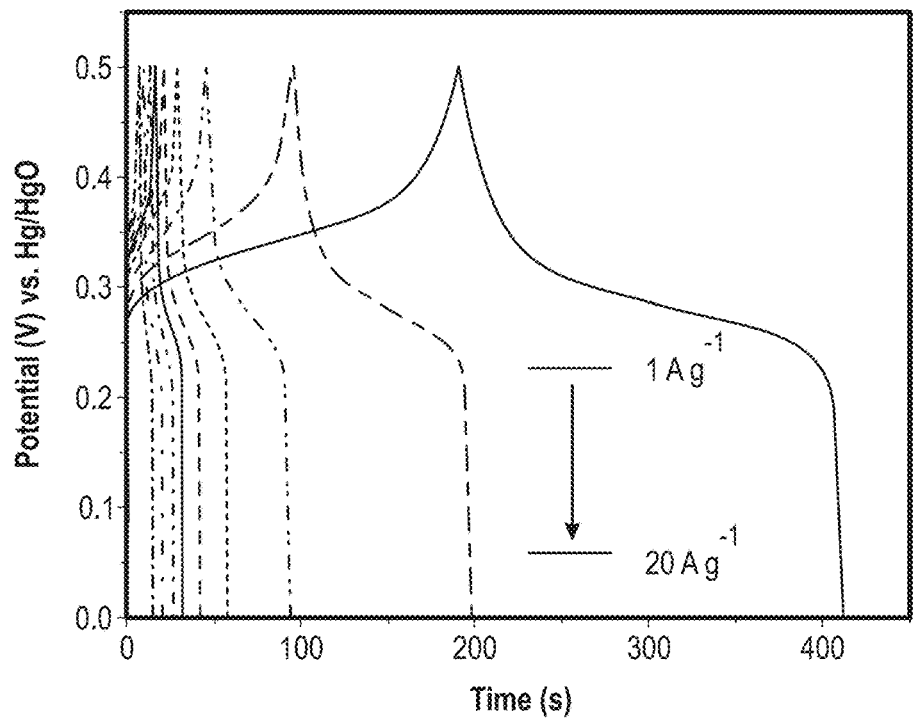
FIG. 5A depicts GCD profiles of Ni—Co4N-2@NC electrode at a varying current density ranging from 1 to 10 Ag−1, in accordance with the present invention.
Figure 5B:
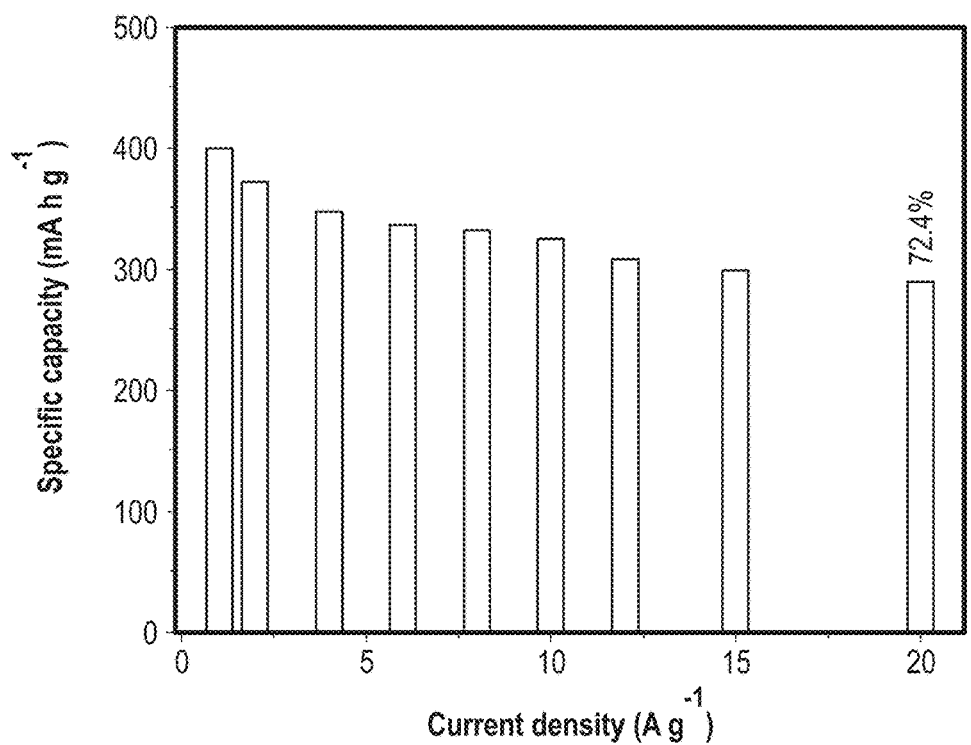
FIG. 5B shows how specific capacity is evaluated from the GCD profiles, in accordance with the present invention.
Figure 5C:
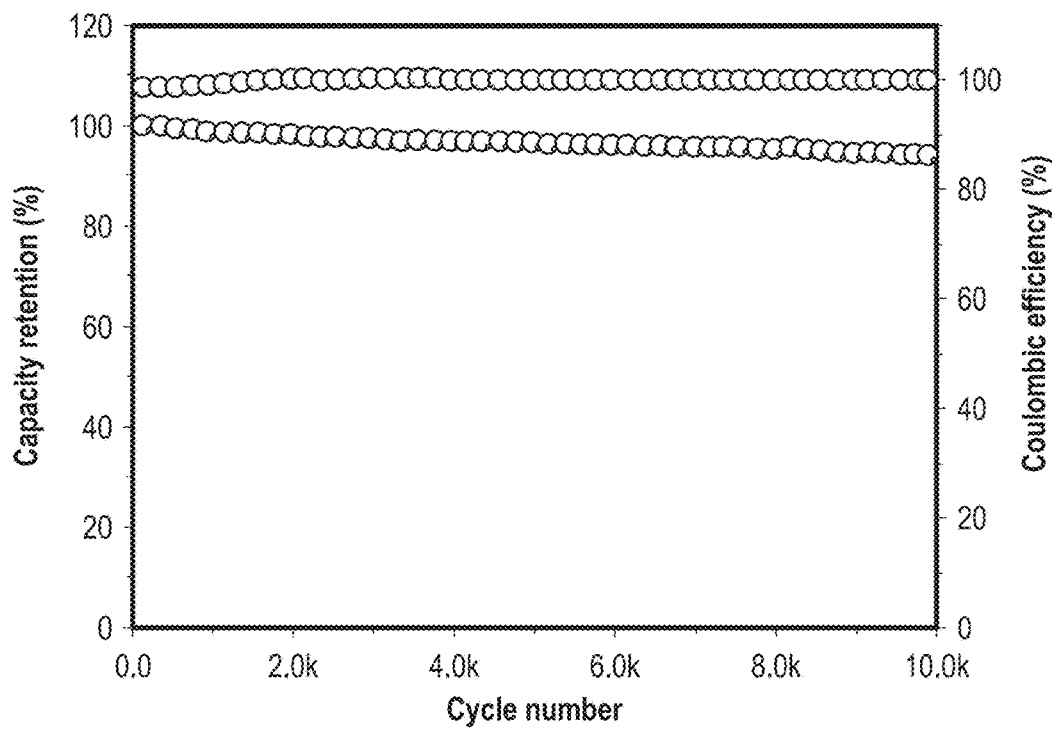

The cycling stability of the i-Co4N-2@NC electrode was explored by repeating 10,000 charging-discharging cycles at a current density of 15Ag−1. The resulting graph of capacity retention with cycle number is depicted in FIG. 5C.

Figure 5D:
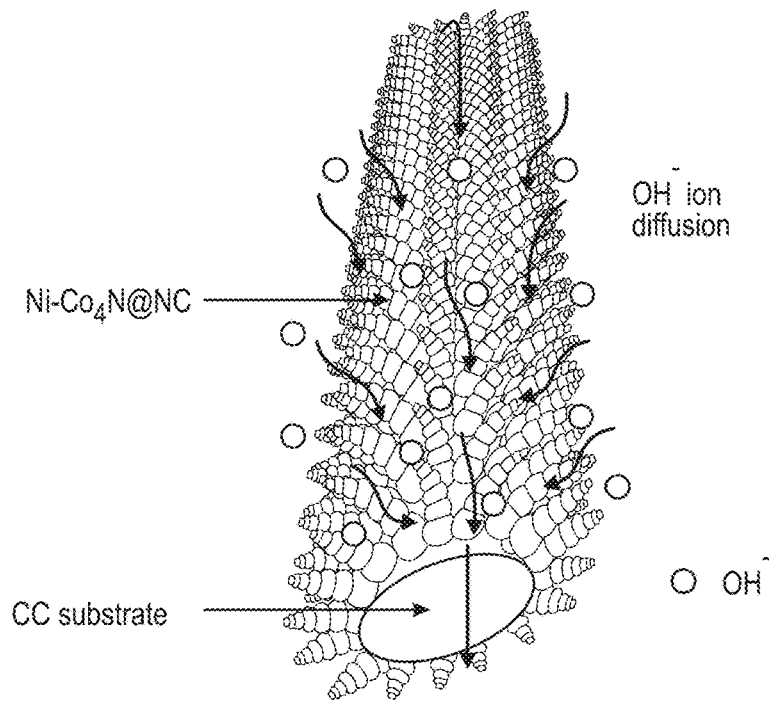

FIG. 5D depicts the schematics for the charge storage process of Ni—Co4N@NC electrode in a KOH electrolyte, in accordance with the present invention.

Figure 6A:
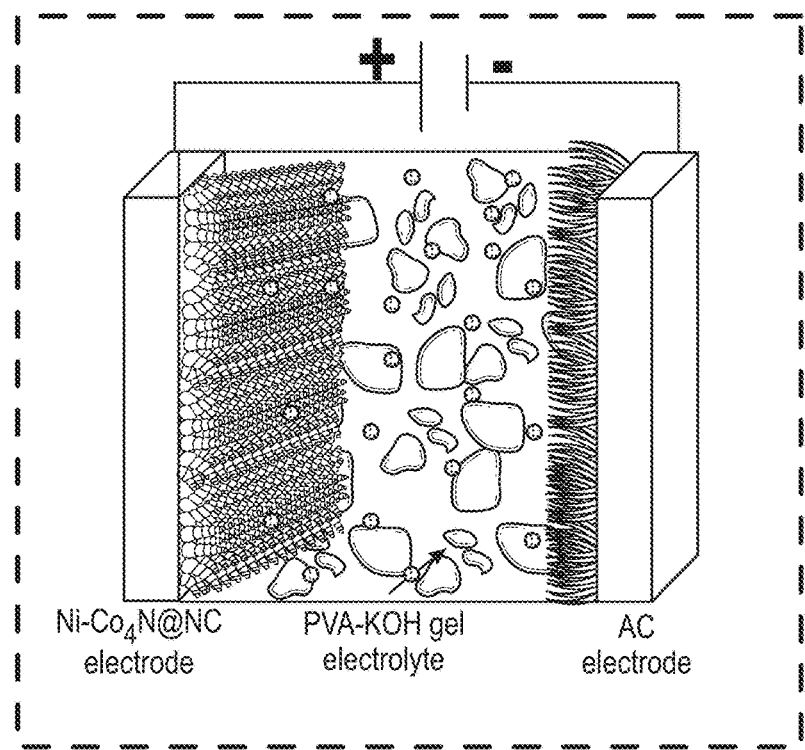
Figure 6B:
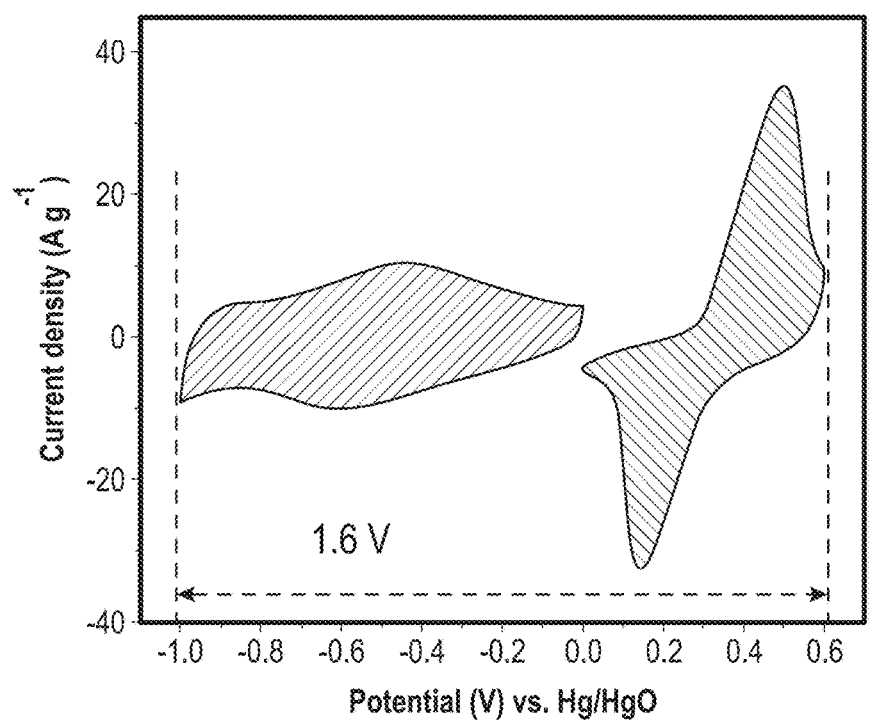

FIG. 6A presents the specific capacity is evaluated and obtained results, in accordance with the present invention and FIG. 6B presents the equivalent circuit fitted to the Nyquist plot, in accordance with the present invention.

Figure 6C:
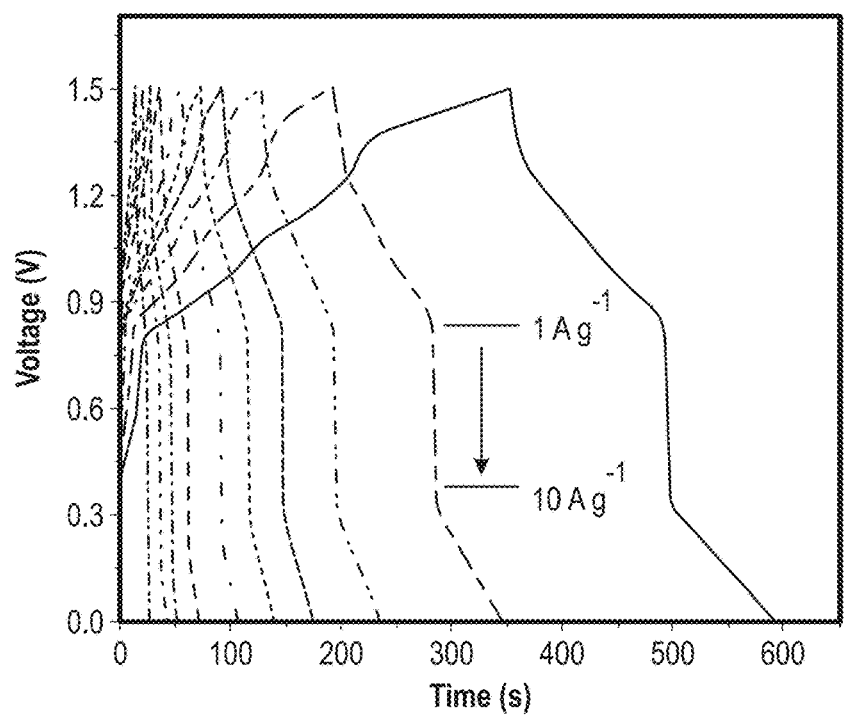

The intercept of Nyquist plot to the real x-axis provides value of Rs, and the magnified Nyquist plots are presented in FIG. 6C.

Figure 6D:
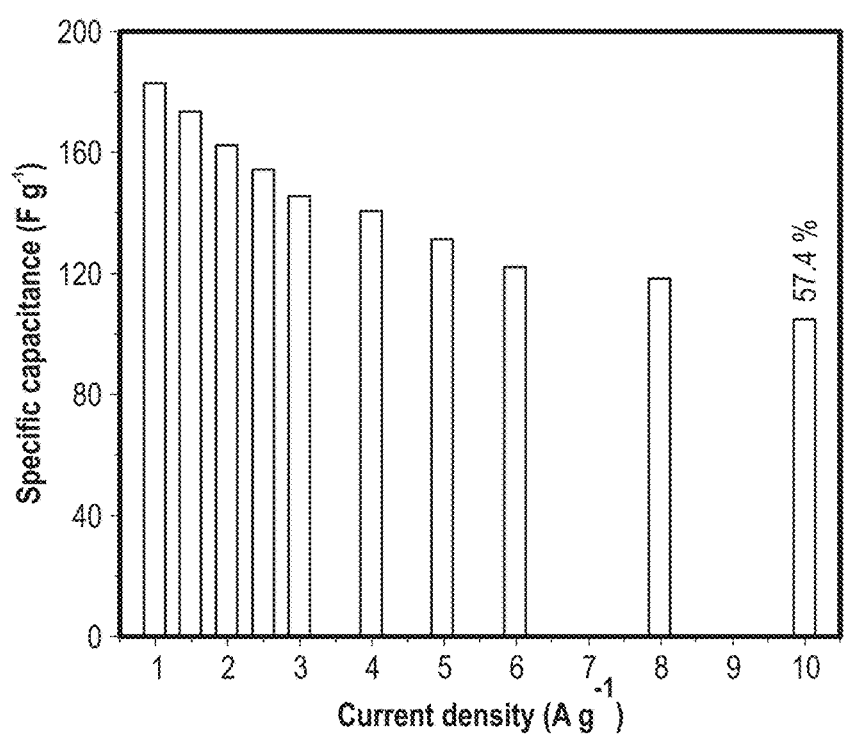

FIG. 6D shows separate charge storage parts at a sweep rate of 100 mVs$^{-1}$, wherein the inside shaded region signifies the diffusion-controlled contribution.

Figure 7A:
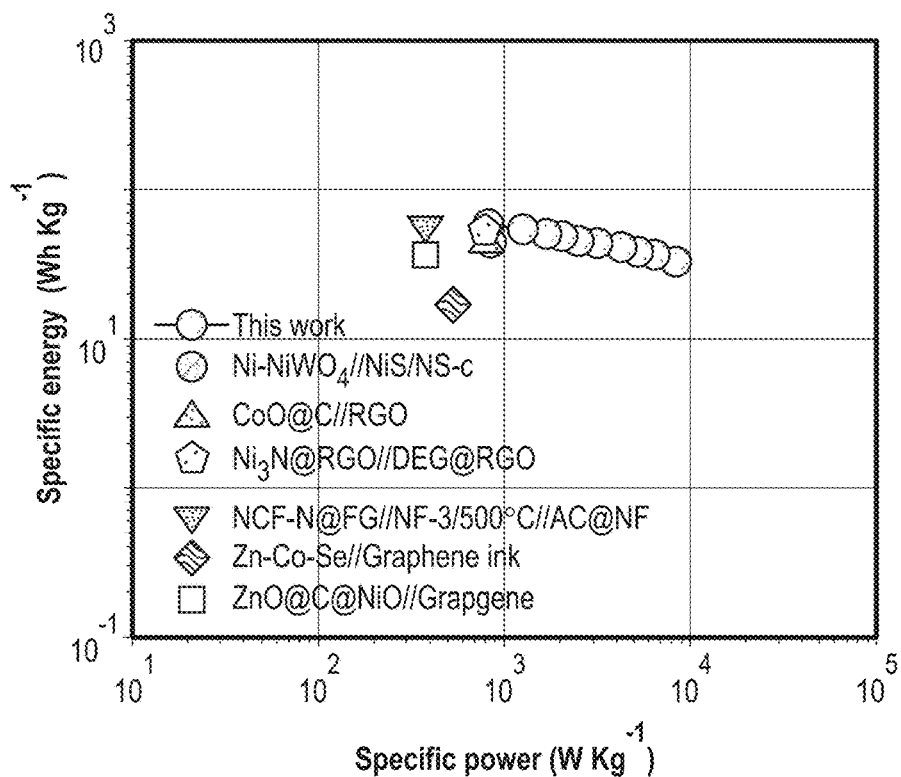
Figure 7B:
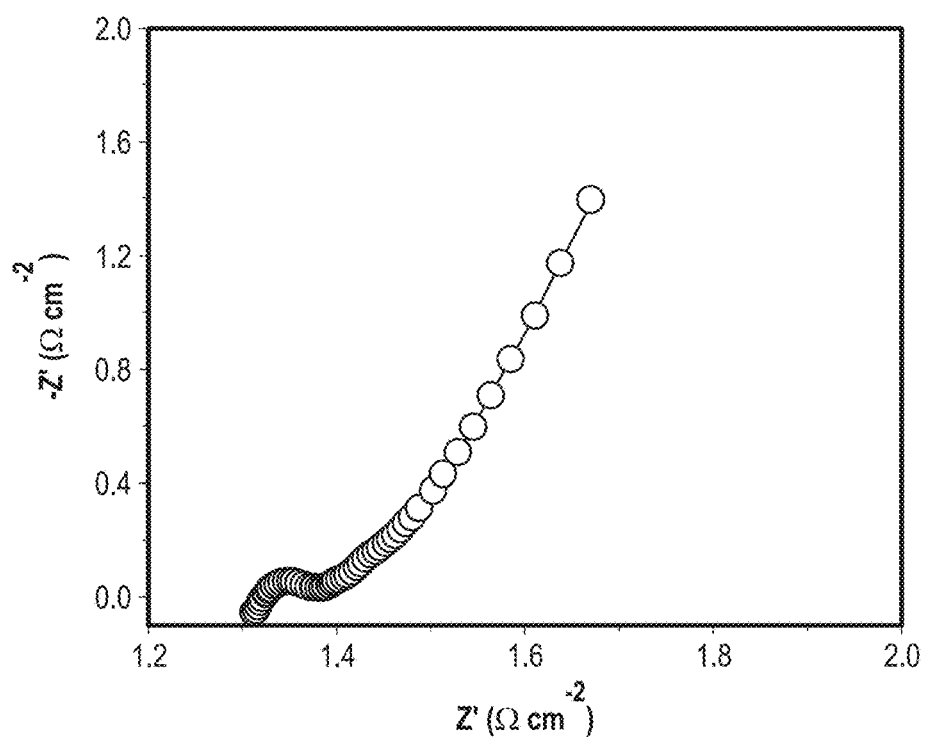

To support the superiority of Ni—Co4N-2@NC electrode, ex situ scanning electron microscope (SEM) and x-ray diffraction analysis (XRD) measurements were performed after cycling. The SEM image of Ni—Co4N@NC is provided in FIG. 7A and the XRD pattern after cycling is shown in FIG. 7B.

Figure 7C:
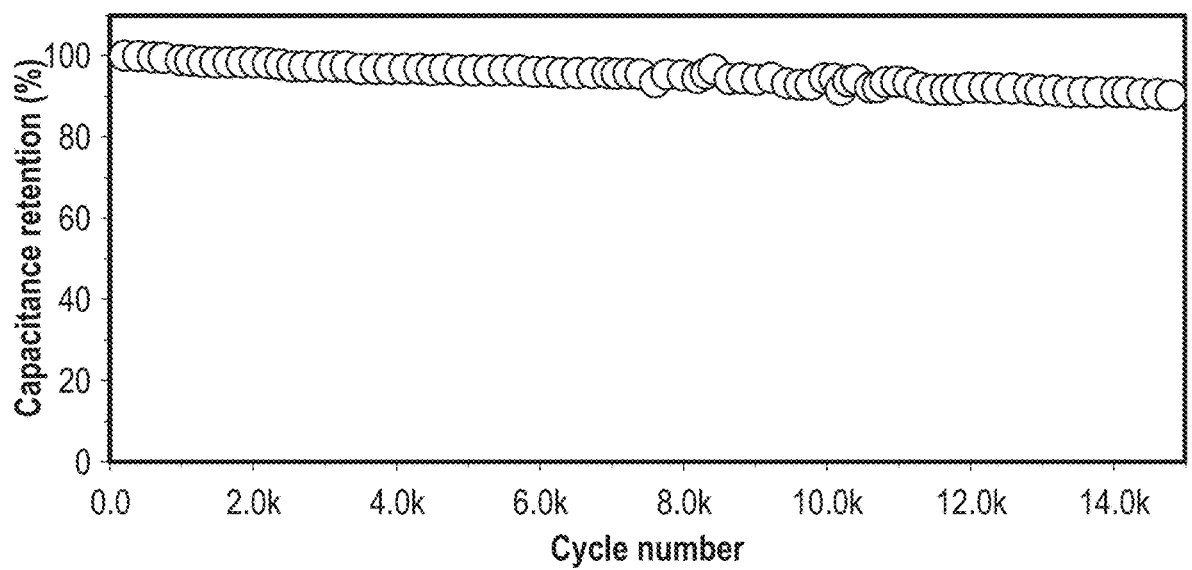

FIG. 7C shows how the HSCs cell retained 89.7% of its preliminary capacity over 15,000 cycles, indicating an outstanding cycling stability.

Figure 8A:
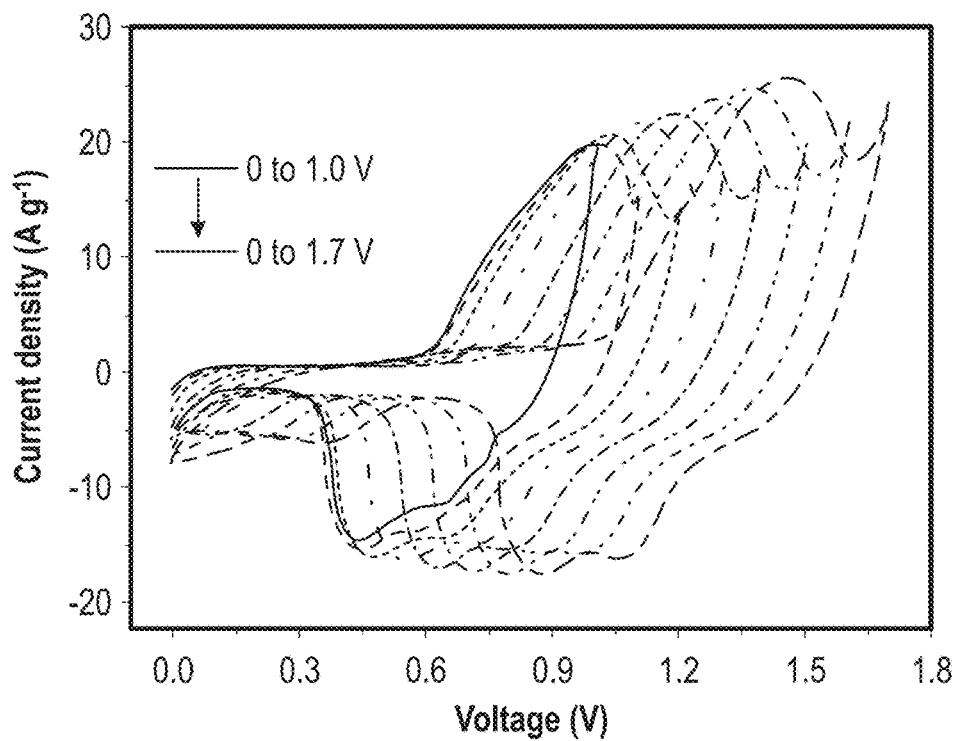

FIG. 8A demonstrates the CV profiles of Ni—Co4N-2@NC/AC HSC cells recorded at voltage windows from 0 to 1.0 to 0-1.7 V at a fixed sweep rate of 100 mVs$^{-1}$.

Figure 8B:
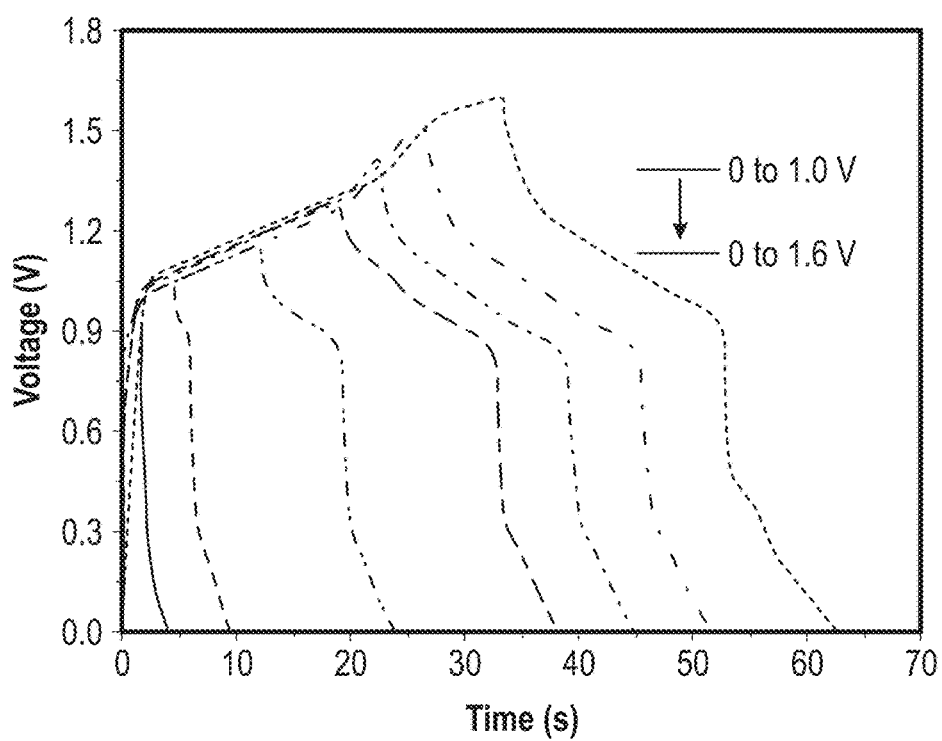
Figure 8C:
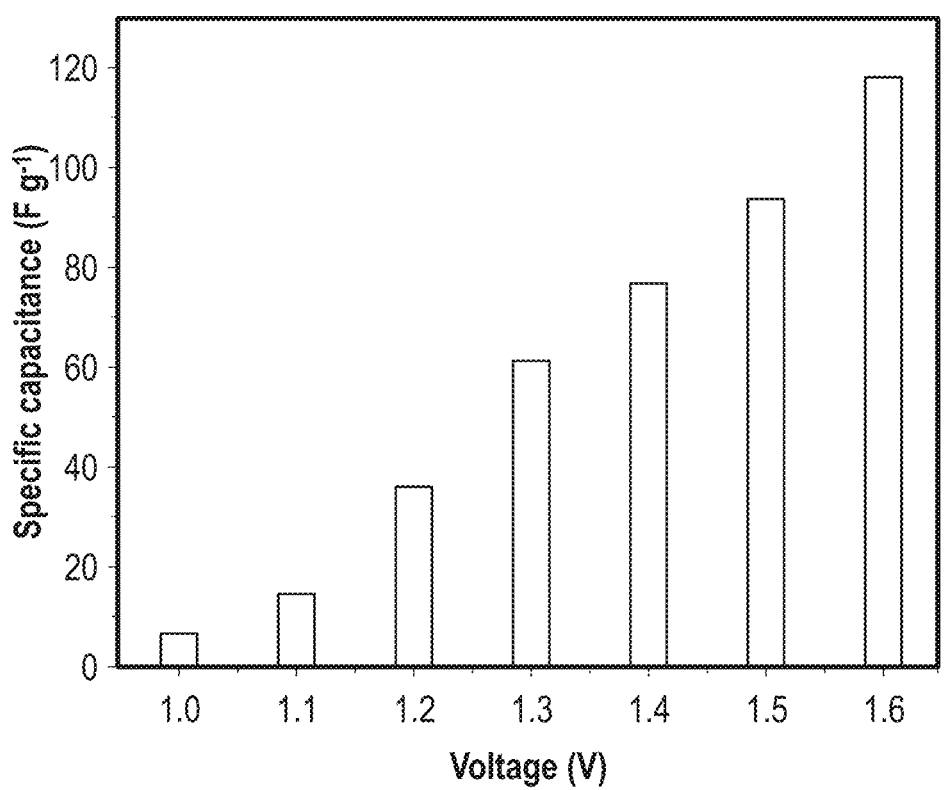

GCD profiles recorded at different voltage windows demonstrate non-linear shapes with linear enhancement in both charge and discharge times amid voltage window are shown in FIG. 8B, and the specific capacitance calculated at different voltage windows is shown in FIG. 8C.

DETAILED DESCRIPTION OF THE INVENTION

The aspects of the utilization of hetero-atomic self-supported metal nitrides for high energy hybrid supercapacitor (HSC) cells, according to the present invention will be described in conjunction with FIGS. 1-8. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

In accordance with the present invention, nitridation-induced in situ coupling of novel, highly-efficient Ni—Co4N nanoparticles entrenched in N-doped carbon matrix is performed via a facile pyrolysis of layered Ni—Co hydroxide decorated on PANI/CC—polyaniline (PANI) nanotubes on the basis of a carbon cloth (CC). Additionally, the nitrogenous gases released from the pyrolysis of PANI are innovatively used to encourage in-situ conversion of NiCo@PANI to Ni—Co$_4$N@NC. The N-doped carbon network derived on CC forms a stable and highly conductive interconnected network. The prepared electrode possesses heteroatoms, which enrich electrochemically active sites and thereby electrochemical performance. Benefiting from all these promising features, the resultant Ni—Co$_4$N@NC electrode shows exceptionally high electrochemical performance for supercapacitors. Furthermore, the HSCs cell constructed with Ni—Co$_4$N@NC and activated carbon (AC) as cathode and anode, respectively demonstrates specific energy of 57.2 Wh kg$^{-1}$ at a specific power of 843.8 W kg$^{-1}$ and capacity retention of 89.7% after 15,000 cycles.

The self-supported integrated structure of electrode consisting of heteroatoms is advantageous for high performance energy storage applications. In accordance with the present invention, hetero-atomic Ni—Co$_4$N nanoparticles laminated on highly conductive nitrogen-doped carbon (NC) matrix are developed through in-situ nitridation (a process that results in the formation of nitrides in a material) for high energy and stable hybrid super-capacitor (HSC). The plenty of available and rendering electrochemically active sites, specifically, single atom Ni, Co$_4$N nanoparticles, heteroatomic N-doped carbon matrix, and their several synergistic effects facilitate fast electron transfer and superior electrochemical performance. Benefiting from these merits, the resultant Ni—Co$_4$N@NC electrode demonstrates robust electrochemical activity with high specific capacity of 397.5 mA h g$^{-1}$, high rate capability of 72.4% and superior cycling stability over 10,000 cycles. The hetero-atomic Ni—Co4N@NC electrode is further employed for the HSC cell beside with the activated carbon (AC) electrode, which establishes a specific energy of 57.2 Wh kg$^{-1}$ at a specific power of 843.8 W kg$^{-1}$ and cyclic stability of 89.7% after 15,000 cycles. The present invention highlights the utilization of hetero-atomic self-supported metal nitrides for the high energy HSCs cell, paving the way to the expansion of highly efficient electrode materials for the future energy storage systems.

Considering experimental details pertaining to the present invention, the below mentioned chemicals are analytical grade and used as received without further purification. Ammonium persulfate ((NH$_4$)$_2$S$_2$O$_8$), aniline, cobalt nitrate hexahydrate (Co(NO$_3$)$_2$·6H$_2$O), nickel nitrate hexahydrate (Ni(NO$_3$)$_2$·6H$_2$O), ammonium fluoride (NH$_4$F), urea (CO(NH$_2$)$_2$), potassium hydroxide (KOH), hydrochloric acid (HCl), activated carbon (AC), carbon black, polyvinylidene fluoride (PVDF) have been used for conducting experiments, in accordance with the present invention. In an embodiment of the present invention, the synthesis of polyaniline (PANI) on carbon cloth (PANI/CC) is conducted, wherein ammonium persulfate was used to polymerize aniline to form PANI on carbon cloth (CC). The well cleaned CC (2 cm×3 cm) was immersed in a 50 mL of mixture solution of 1 M H$_2$SO$_4$ and 0.55 mL aniline placed in an ice bath under magnetic stirring. 50 mL of 1 M H$_2$SO$_4$ containing 0.545 g ammonium persulfate was added dropwise to the above mixture solution. Later, the reaction mixture was placed for 5 hours in the same ice bath. After the reaction, obtained green color PANI deposited CC was washed several times with de-ionized (DI) water and acetone and dried overnight at 60° C. prior to further use.

In another embodiment of the present invention, the synthesis of nickel cobalt precursors on PANI/CC (NiCo@PANI/CC) is conducted. In a typical synthesis, the reaction solution was prepared by adding 0.05M Ni(NO$_3$)$_2$·6H$_2$O, 0.1M Co(NO$_3$)$_2$·6H$_2$O, 0.25M NH$_4$F and 0.5M CO(NH$_2$)$_2$ in 40 mL of DI water. The solution was poured into the Teflon lined stainless-steel autoclave. The piece of PANI/CC (2 cm×3 cm) was immersed into the Teflon liner and autoclave was subjected to hydrothermal treatment at 120° C. for 12 hours. After the autoclave cooled down to room temperature, NiCo@PANI/CC was removed and washed thoroughly with DI water and acetone and dried at 60° C. overnight. In another embodiment, the synthesis of nickel-cobalt nitride and nitrogen-doped carbon on carbon cloth (Ni—Co4N@NC/CC) is conducted. The Ni—Co$_4$N@NC was prepared through the calcination of NiCo@PANI/CC precursor. In a typical synthesis, the prepared NiCo@PANI/CC substrate was subjected for thermal treatment in a tubular furnace at 700° C. for 2 hours at the heating rate of 5° C./min under a mixture of Ar/NH3 (50 sccm) flow, subsequent to which the sample was allowed to cool naturally at room temperature.

Figure 1:
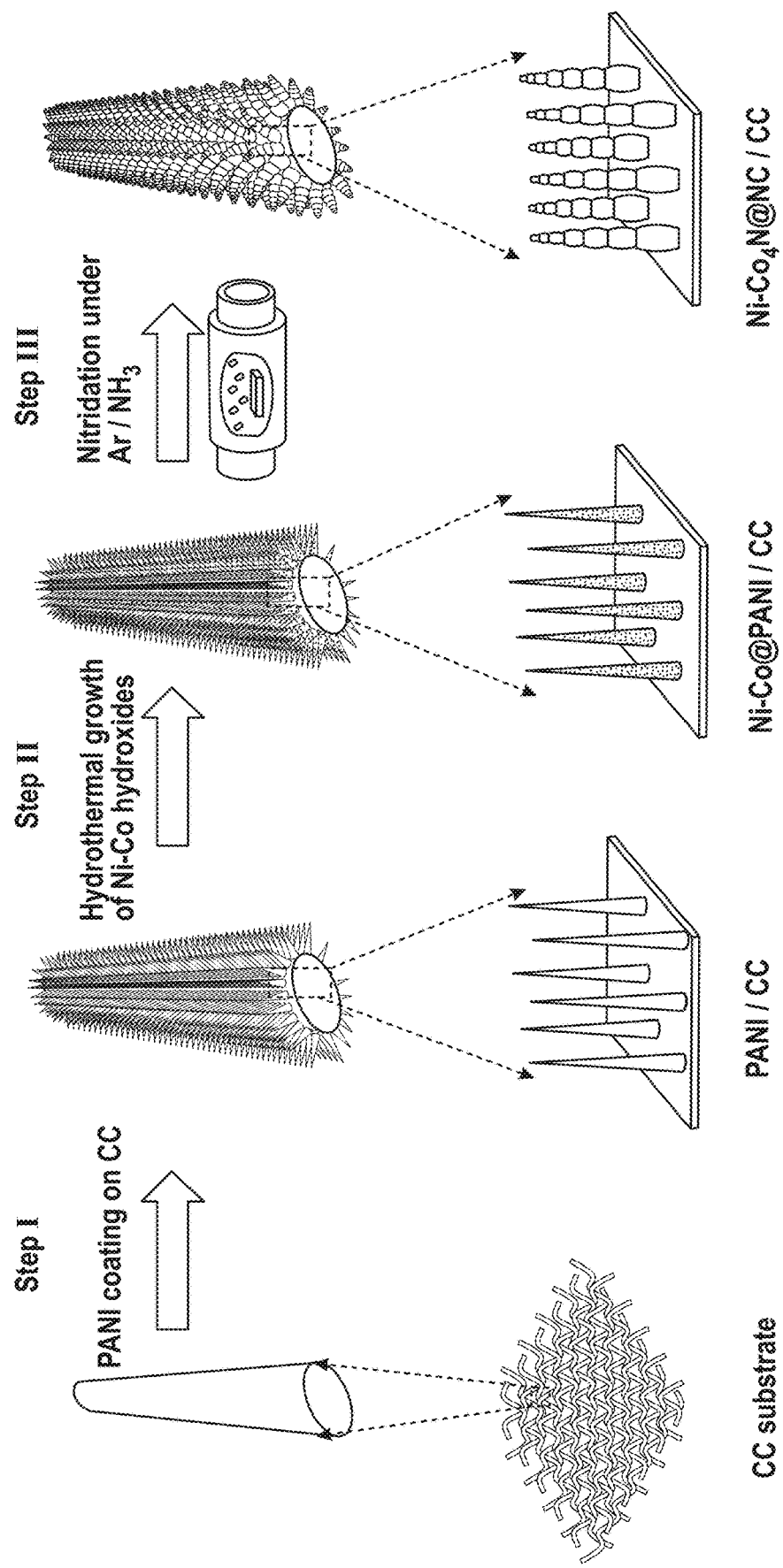
FIG. 1 depicts a facile scheme and steps involved in the preparation of Ni—Co4N@NC nanoparticles arrays on CC, in accordance with the present invention.

Nitridation is one of the most effective processes to prepare specific metal nitrides for various applications including catalysis, batteries and supercapacitors. Heteroatomic Ni—Co$_4$N@NC nanoparticles arrays are successfully prepared through the nitridation of NiCo hydroxides developed on PANI covered CC. A facile scheme and steps involved in the preparation of Ni—Co4N@NC nanoparticles arrays on CC is schematically illustrated in FIG. 1. As shown, firstly, PANI nanowires are grown on a CC substrate through the simple polymerization of aniline in a chilled environment. The PANI requires additional NH$_3$ gas throughout the pyrolysis as well as results in the formation of N-doped carbon matrix between active material and CC substrate, leading to improved supercapacitor features. In the second step, the NiCo precursors are grown on the PANI coated CC under a hydrothermal process, and the obtained materials are then calcinated in a tubular furnace under Ar/NH$_3$ environment at 700° C. It is to be noted that the formation of metal nitrides from NiCo precursors takes place inside the tube furnace. Additionally, carbonization of PANI supply NH$_3$-rich atmosphere within the solid crucible and the PANI decomposes into N-doped carbon.

The microstructure of the obtained materials is analyzed using the scanning electron microscopy (SEM). SEM image for PANI shows that the CC substrate is densely coated by PANI nanowires, which are interconnected to each other. After the hydrothermal process, the PANI/CC substrate surface is fully covered by the dense growth of NiCo precursors. The SEM image reveals that the NiCo precursor nanosheets is assembled into uniformly oriented free-standing 1D nanorods and are perpendicularly anchored on the substrate surface, forming hierarchical arrays. Moreover, the phase structure of PANI/CC and Ni—Co hydroxide precursors are analogous to earlier reported literature which was confirmed by XRD characterization. Following the nitridation treatment, the Ni—Co/PANI precursor is converted into crystalline Ni—Co4N@NC nano-architecture. The Ni—Co4N@NC nano-architecture firmly anchored on the surface of CC, is shown in FIG. 2A. Interestingly, the obtained Ni—Co4N@NC maintains the original morphology of arrays with interconnected nanoparticles. Furthermore, the high-magnification SEM images clearly reveal that the single nanorod is arranged with tiny, stacked nanoparticles (FIGS. 2B and 2C). Further, microstructural details of Ni—Co4N@NC nanoparticle arrays are explored using transmission electron microscopy (TEM). As depicted in FIG. 2D, ~200 nm nanoparticles are connected to form a stacked nanoparticles architecture. The nanoparticles are strongly interconnected to each other and surrounded by N-doped amorphous carbon matrix, which is evidently observed in FIG. 2E. The interconnected nanoparticles exclusive of any observable void offer excellent electrical conductivity for superior performance of SCs. The high resolution TEM (HRTEM) image demonstrates two different interlayer spacings of 0.206 and 0.35 nm, matching the (111) plane of $Co_4N$, the (111) plane of pure nickel metal, and the (002) plan of carbon respectively.

Figure 3A:
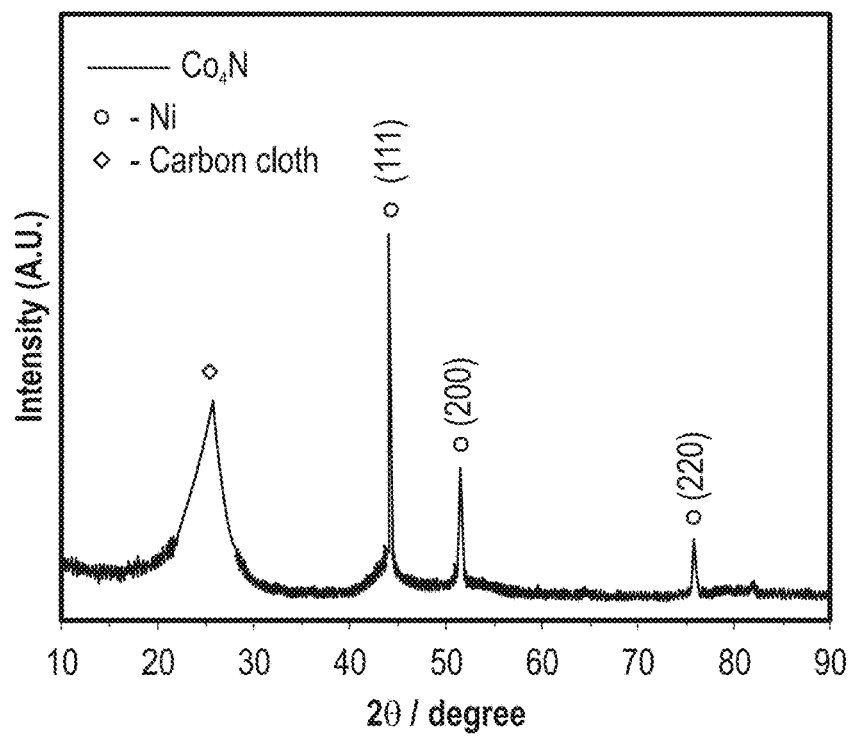
FIG. 3A depicts the XRD pattern for Ni—Co4N@NC, in accordance with the present invention.
Figure 3B:
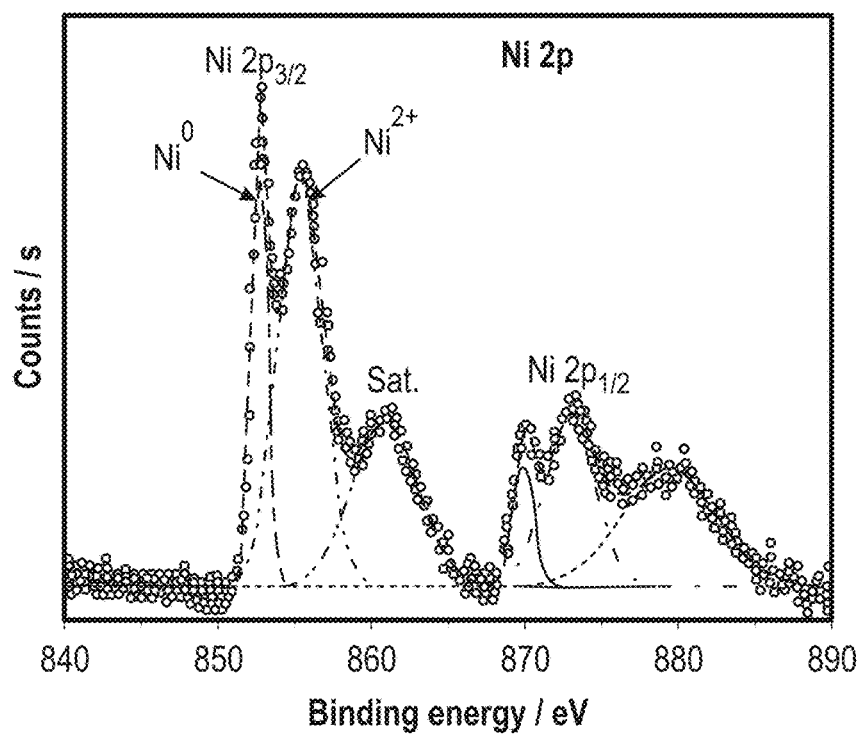
FIG. 3B-F presents the narrow scan XPS spectra of elements in Ni—Co4N@NC, in accordance with the present invention.

The different lattice arrangements in Ni—$Co_4N$@NC nanoparticles offer more surface-active sites for energy storage. Additionally, considering the scanning transmission electron microscopy energy dispersive X-ray spectroscopy (STEM-EDS) element mapping images of Ni—Co4N@NC nanoparticles arrays manifesting the consistent allotment of Ni, Co, C and N elements, and considering the morphology for other samples prepared by varying the molar ratios—there is almost no change in the surface morphology of Ni—$Co_4N$-1@NC and Ni—$Co_4N$-3@NC samples. The crystallographic arrangement of Ni—$Co_4N$@NC was inspected with X-ray diffraction (XRD) study. The XRD pattern for Ni—$Co_4N$@NC is depicted in FIG. 3A. The characteristic diffraction peaks situated at 2θ of 44.2°, 51.5° and 75.8° are accredited to the (111), (200) and (220) planes of the cubic $Co_4N$ phase whereas the diffraction peaks placed at 44.2°, 51.5°, and 76.2° are matches to the (111), (200) and (220) planes of metallic cubic nickel phase, respectively. Considering the XRD patterns for Ni@NC and Co4N@NC—the diffraction peaks of $Co_4N$ phase and metallic nickel are overlaps in the Ni—$Co_4N$@NC. Thus, the XRD pattern clearly confirms the coexistence of both $Co_4N$ and nickel metal in Ni—$Co_4N$@NC and the successful conversion of NiCo/PANI precursors into metal nitrides. Furthermore, no impurity peaks were observed in the pattern.

Figure 3C:
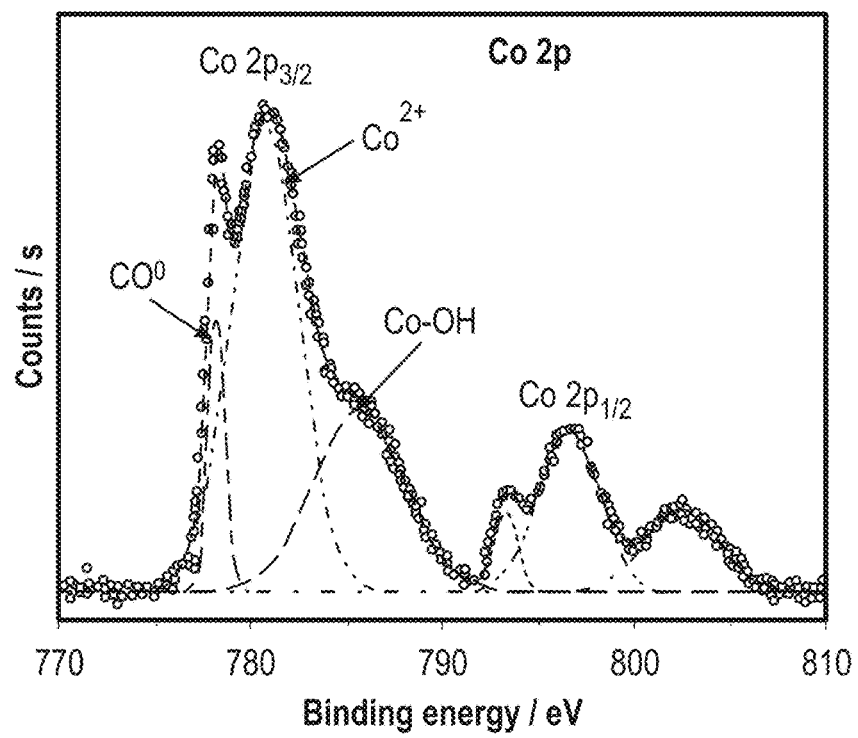
Figure 3D:
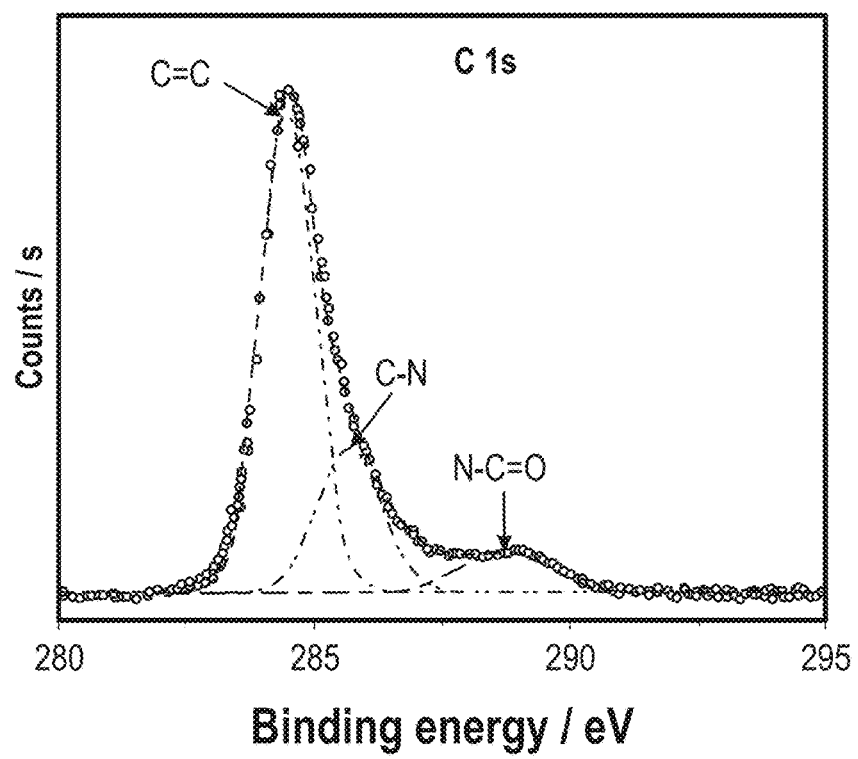
Figure 3E:
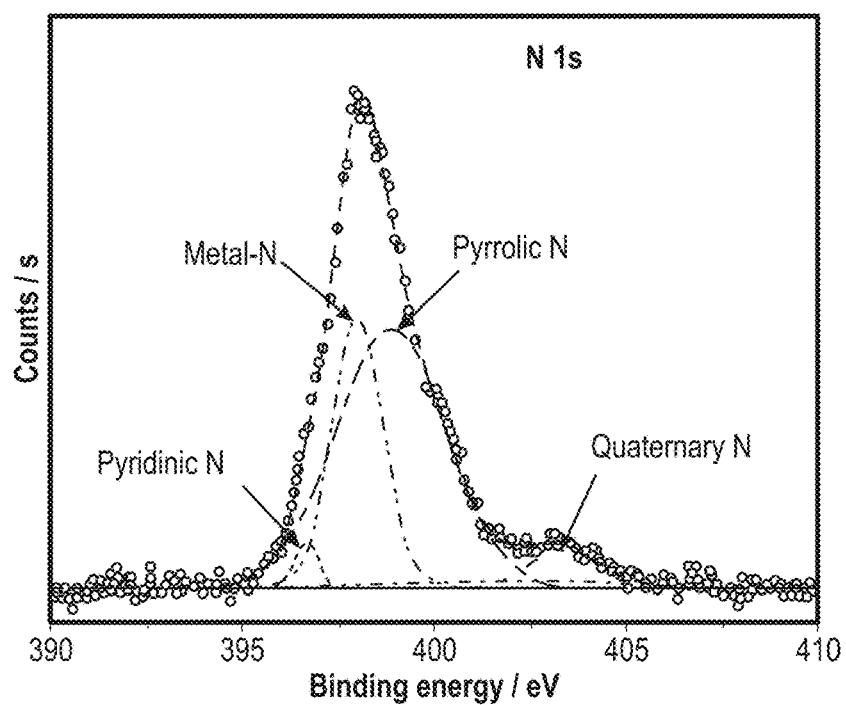
Figure 3F:
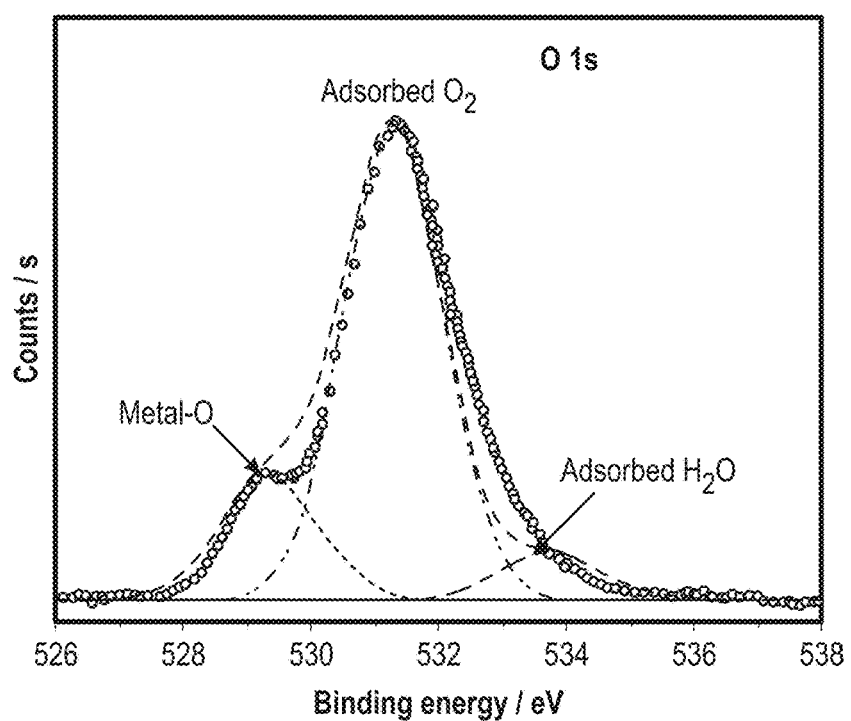

With the purpose of getting comprehensive updates corresponding to the chemical bonding states of elements in the obtained material, X-ray photoelectron spectroscopy (XPS) investigation was executed. The XPS broad scan spectrum of Ni—Co4N@NC clearly evidences for the occurrence of Ni, Co, N and C elements lacking other contaminants. The narrow scan XPS spectra of elements in Ni—$Co_4N$@NC are presented in FIG. 3B-F. As shown in the Ni 2p XPS spectrum (FIG. 3B), the Ni 2p3/2 peak is deconvoluted into peaks analogous to sharp metallic NiO peak at 852.6 eV and a peak at 855.4 eV is recognized as Ni2+ state. The occurrence of metallic nickel specifies to partly reduced nickel during calcination at high temperatures entails the chance of higher electrical conductivity in addition to proficient electrochemical performance. The Co 2p spectrum is deconvoluted into multiple peaks equivalent to Co 2p3/2 and Co 2p1/2 presenting that the Co can be exist in more than one oxidation state (FIG. 3C). In the Co 2p3/2 XPS spectrum, the peak observed at 778.2 eV may be ascribed to the metallic Co0, which probably formed during the thermal treatment at high temperatures. The peak observed at 780.6 eV is associated to the Co2+-N phase while the peak at 785.6 eV is attributed to Co—OH moieties which may be assumed to come from the surface contact of Co metal with moisture in air. Therefore, it can be proved from these results that the inert atmosphere (Ar/$NH_3$) and $NH_3$ gas liberated from the pyrolysis of PANI endorse the formation of metallic nitrides.

Surprisingly, pyrolysis of PANI forms N-doped carbon matrix over the CC, which is further confirmed from C 1s and N 1s XPS spectra. The C is spectrum (FIG. 3D) shows the occurrence of three different kinds of carbon species, C=C (284.4 eV), C—N (285.7 eV) and N—C=O (288.3 eV). The N 1s XPS spectrum (FIG. 3E) is split into four different types of nitrogen species at 396.6, 397.9, 398.8 and 403.3 eV matching to metal-N, pyridinic-N, pyrrolic-N and graphitic-N, respectively. As clearly seen, a strong peak is observed at 396.6 eV corresponding to the metal-N bond. The presence of pyridinic-N and graphitic-N in Ni—$Co_4N$@NC acts as useful non-metallic active sites for the efficient electrochemical process. Additionally, the O 1s spectrum shown in FIG. 3F reveals the metal-oxygen bond (529.4 eV), adsorbed oxygen (531.3 eV) and unavoided adsorbed water molecules (533.8 eV).

Figure 4A:
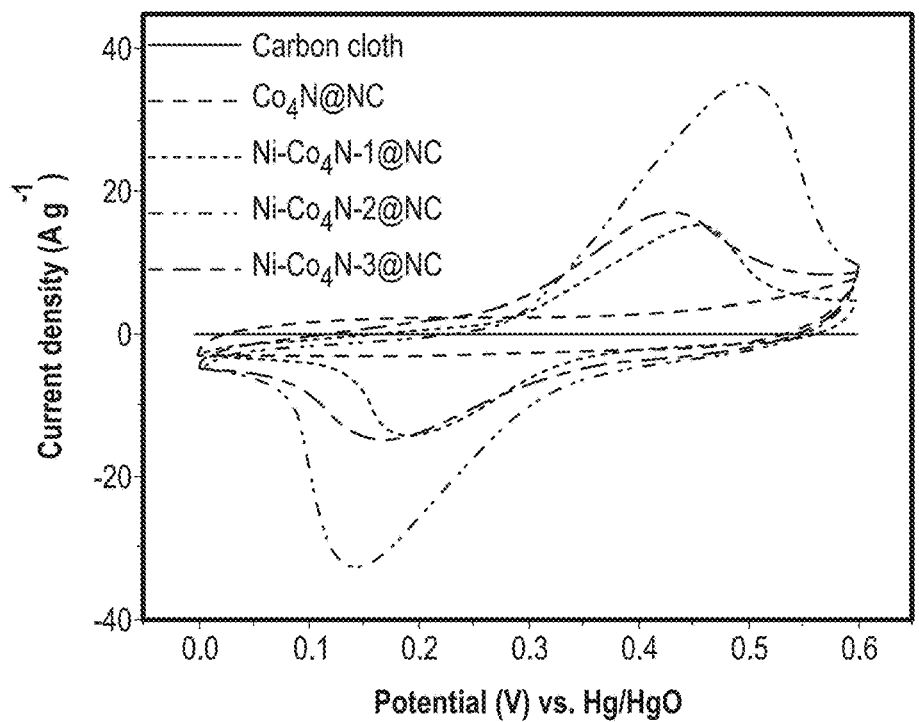
FIG. 4A shows the relative CV profiles for all the electrodes, in accordance with the present invention.
Figure 4B:
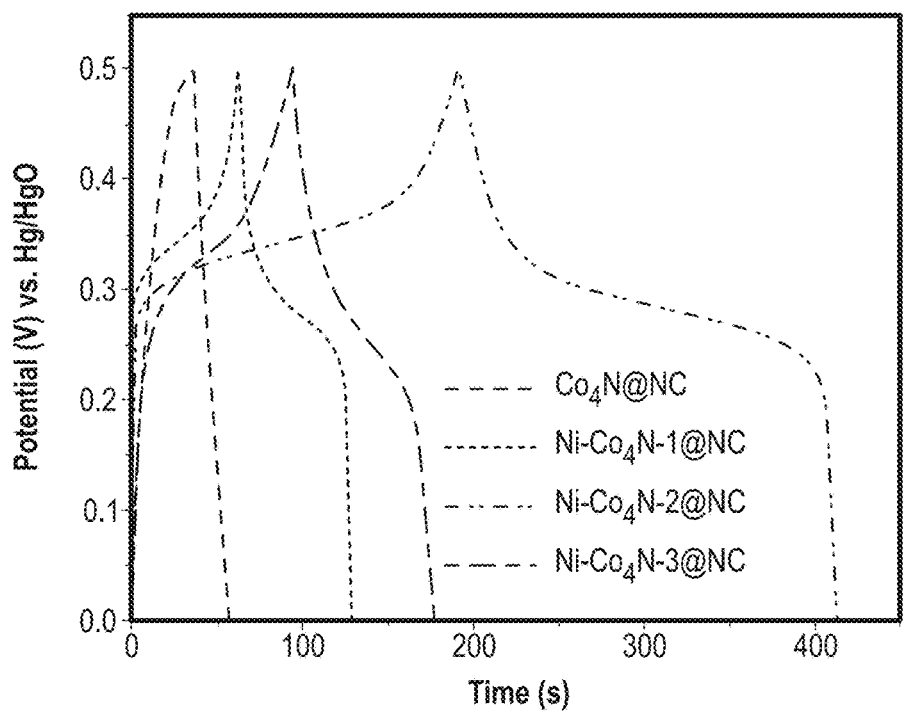
FIG. 4B illustrates comparative GCD profiles for Co4N@NC, Ni—Co4N-1@NC, Ni—Co4N-2@NC and Ni—Co4N-3@NC electrodes all at an identical current density of 1 Ag−1 in an applied potential window of 0 to 0.5V (vs. Hg/HgO).

The energy storage performance of obtained materials as supercapacitor electrodes were measured in standard three-electrode setup with 1 M KOH as an electrolyte. Initially, CV (capacitance-voltage profiling) tests for all the prepared samples as electrodes were performed at an identical sweep rate of 100 mVs$^{-1}$ in a potential window of 0-0.6 V (vs. Hg/HgO). The relative CV profiles for all the electrodes are depicted in FIG. 4A. The area shown by the CV profiles of CC and subsequent current response is very small, therefore the contribution of CC towards energy storage capability is negligible. The CV profiles of remaining electrodes disclose superior CV integrated area and current response along with prominent redox pairs. In comparison with $Co_4N$@NC, Ni—$Co_4N$@NC electrodes illustrate a larger integral CV profile area with dominant cathodic and anodic peaks. The Ni—Co4N-2@NC electrode exhibited relatively higher current response and an integrated CV profile area, suggesting higher charge storage capacity of the active material. FIG. 4B illustrates comparative GCD profiles for Co4N@NC, Ni—$Co_4N$-1@NC, Ni—$Co_4N$-2@NC and Ni—$Co_4N$-3@NC electrodes all at an identical current density of 1 Ag$^{-1}$ in an applied potential window of 0 to 0.5V (vs. Hg/HgO). The charging-discharging features of all electrodes demonstrate its characteristic redox features which are analogous to the CV profiles. Discharge time for Ni—$Co_4N$-2@NC electrode was obviously longer than those of other electrodes.

Figure 4C:
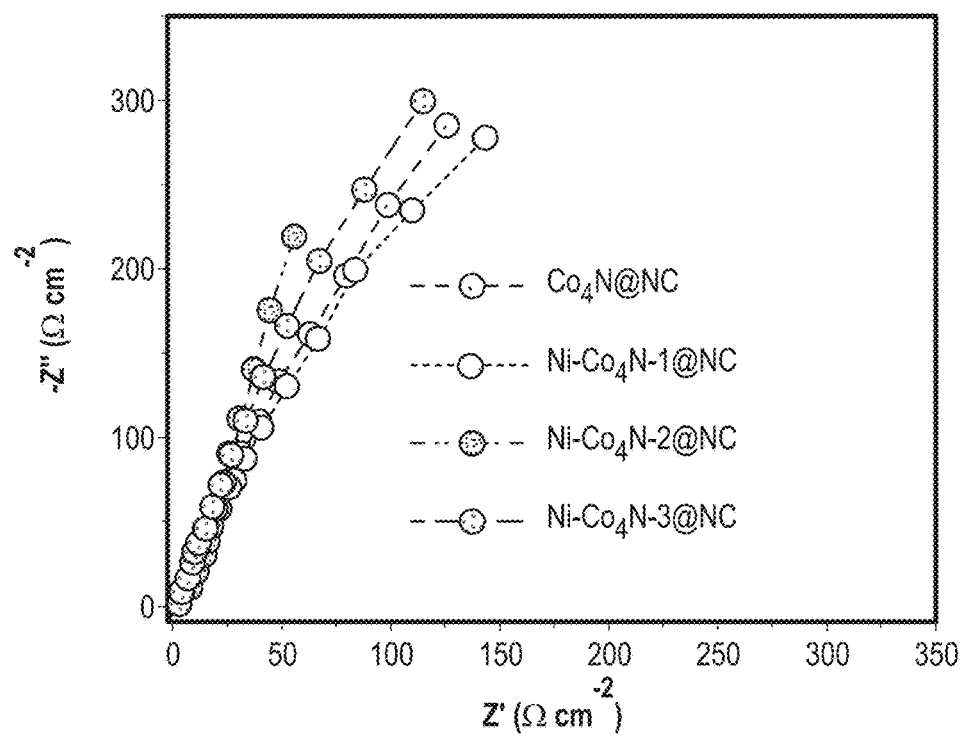
FIG. 4C demonstrates the Nyquist plots for the Co4N@NC, Ni—Co4N-1@NC, Ni—Co4N-2@NC and Ni—Co4N-3@NC electrodes in an applied frequency range at a fixed voltage of 10 mV.

Further, in order to confirm the high supercapacitors performance of Ni—$Co_4N$-2@NC, the specific capacity is evaluated and the obtained results are presented in FIG. 6A. The $Co_4N$@NC, Ni—$Co_4N$-1@NC, Ni—$Co_4N$-2@NC and Ni—$Co_4N$-3@NC electrodes reveal a specific capacity of 99, 135.2, 397.5 and 200.7 mAhg$^{-1}$, respectively at 1 Ag$^{-1}$, thus confirming that the Ni—Co$_4$N-2@NC electrode has high specific capacity, and the enhanced electrochemical performance of Ni—Co$_4$N-2@NC electrode may be ascribed to the decrease in valance states of Ni2þ and Co2þ within the typical electrode as a result of the nitridation in inert atmosphere. The electrochemical impedance spectroscopy (EIS) is a widely studied technique to estimate the resistance and electrochemical behavior of electrodes in various applications. Herein, to know the reason behind superior performance and conductivity of electrode, EIS analysis was performed. FIG. 4C demonstrates the Nyquist plots for the Co$_4$N@NC, Ni—Co$_4$N-1@NC, Ni—Co$_4$N-2@NC and Ni—Co$_4$N-3@NC electrodes in an applied frequency range at a fixed voltage of 10 mV. The equivalent circuit fitted to the Nyquist plot is presented in the FIG. 6B. The Nyquist plots depicts high frequency area related to the equivalent series resistance ($R_s$) which merge solution resistance, interface resistance of active material to the current collector and intrinsic resistance of active electrode material, whereas the sloped line in low-frequency area associated with the diffusion resistance.

More importantly, the intercept of Nyquist plot to the real x-axis provides value of $R_s$. The magnified Nyquist plots are presented in FIG. 6C. The semicircle arc in the high-frequency region indicates the charge transfer resistance ($R_{ct}$) (it can be observed from the figures that the Ni—Co$_4$N-2@NC electrode reveals $R_s$ of 0.72 Ωcm$^{-2}$, which is lower than those of Co$_4$N@NC (0.86 Ωcm$^{-2}$), Ni—Co$_4$N-1@NC (0.73 Ωcm$^{-2}$) and Ni—Co$_4$N-3@NC (0.76 Ωcm$^{-2}$) electrodes. Additionally, Co$_4$N@NC, Ni—Co$_4$N-1@NC, Ni—Co$_4$N-2@NC and Ni—Co$_4$N-3@NC electrodes depict a very small $R_{ct}$ value of 0.15, 0.19, 0.04 and 0.25 Ωcm$^{-2}$, respectively. These results suggest a higher electrical conductivity and efficient redox kinetics of a Ni—Co$_4$N-2@NC electrode. The results also indicate an improved charge transport kinetics and conductivity after nitridation. Thus, the comparative CV, galvanostatic charge/discharge (GCD) and Electrochemical impedance spectroscopy (EIS) analysis proves that the Ni—Co$_4$N-2@NC electrode has outstanding energy storage performance and excellent conductivity due to the decrease in oxidation state after nitridation and the material becomes more metallic.

Figure 4D:
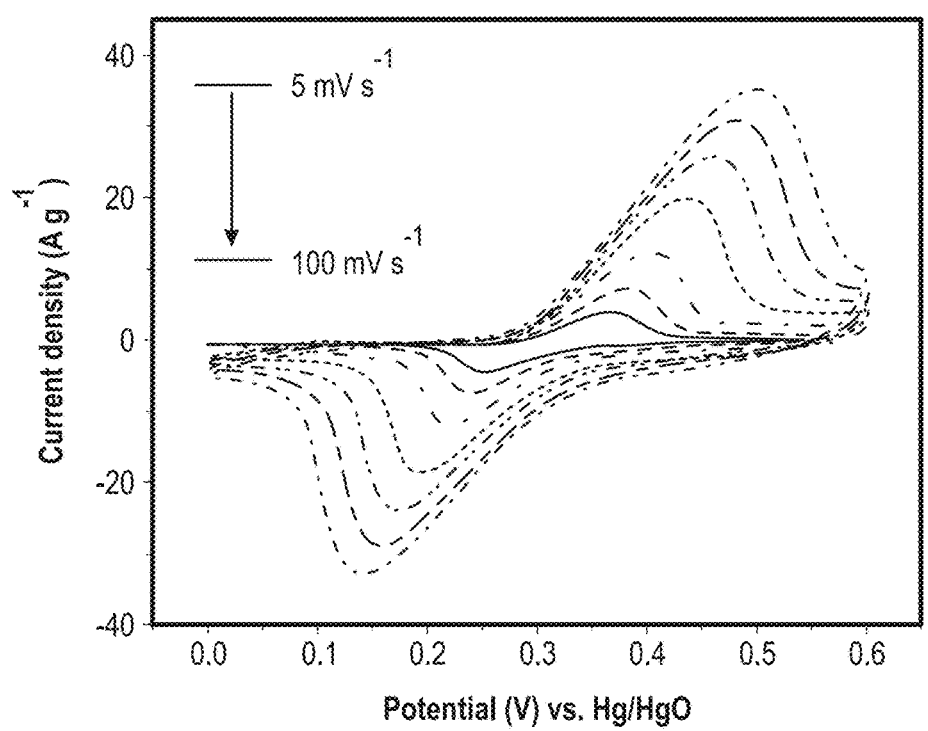
FIG. 4D shows the CV profiles for Ni—Co4N-2@NC recorded at sweep rates from 5 to 100 mVs−1 depicts fine redox peaks in both cathodic and anodic region, in accordance with the present invention.
Figure 4E:
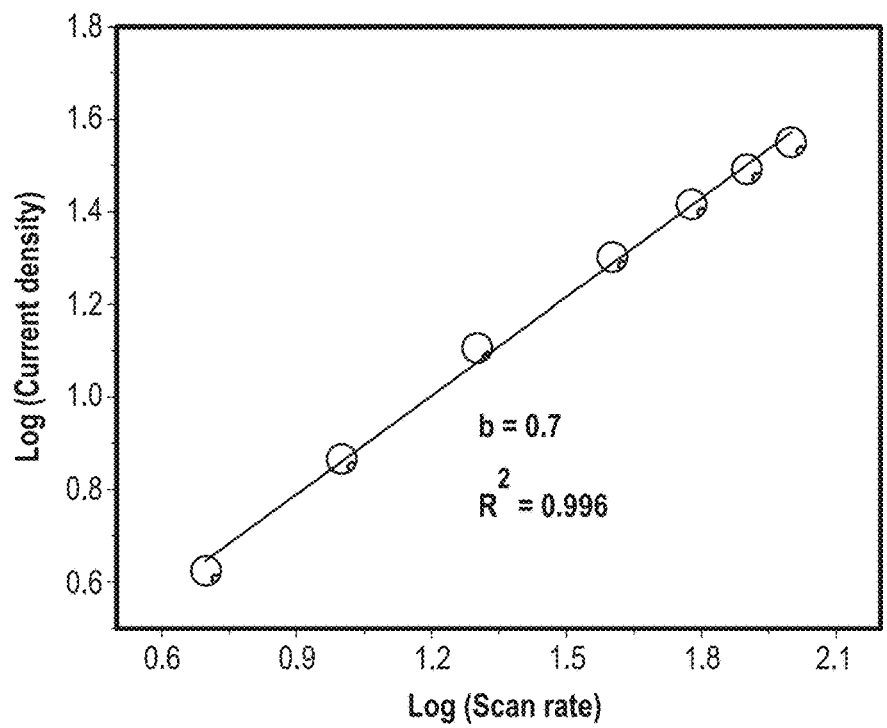
FIG. 4E shows the investigation of b-value for Ni—Co4N-2@NC electrode being achieved by taking into consideration the CV profiles at various sweep rates, in accordance with the present invention.

Considering the best electrochemical activity of Ni—Co$_4$N-2@NC electrode, additional three-electrode tests were carried out to evaluate the rate capability, energy storage features and long-term cycling performance. To evaluate the rate performance and kinetics of Ni—Co$_4$N-2@NC electrode—CV and GCD tests were executed at different sweep rates. The CV profiles for Ni—Co$_4$N-2@NC recorded at sweep rates from 5 to 100 mVs$^{-1}$ depicts fine redox peaks in both cathodic and anodic region, representing a good redox behaviour of the active material (FIG. 4D). The orderly enhancement in CV profile area with sweep rates specifies the excellent rate capability of the Ni—Co$_4$N-2@NC electrode in the KOH electrolyte. Furthermore, current density increases linearly with sweep rates, indicating the better reversibility of the electrode and full utilization of material at each sweep rate. To further scrutinize the charge storage kinetics of Ni—Co$_4$N-2@NC electrode, the correlation among the current density and sweep rate (υ) was scrutinized according to the power law equation I=a·υb, where a and b are variables. The parameter b is evaluated by considering slope of log(i) versus log(υ) plot. If b-value is 1, charge storage kinetics is a feature of mainly capacitive route; whereas if b-value is 0.5, charge storage kinetics is attributed to diffusion-controlled, that is the redox dominating route. Typical battery-type materials (Co$_3$O$_4$, and Ni(OH)$_2$) show b-value of 0.5 where capacitive materials (such as Fe$_2$O$_3$, MnO$_2$, V$_2$O$_5$, RuO$_2$) possess b-value of 1. The investigation of b-value for Ni—Co4N-2@NC electrode is achieved by taking into consideration the CV profiles at various sweep rates as shown in FIG. 4E. From the power law equation, the present study results showed b-value of 0.7, signifying the charge storage is combination of both capacitive as well as redox-dominant processes. Furthermore, exact charge storage contributions can be separately quantized for capacitive and diffusion-controlled processes at a particular potential according to the modified power law, i=k1v+k2v1/2, wherein k1 and k2 are the constants for capacitive and diffusion-controlled processes, respectively.

Figure 4F:
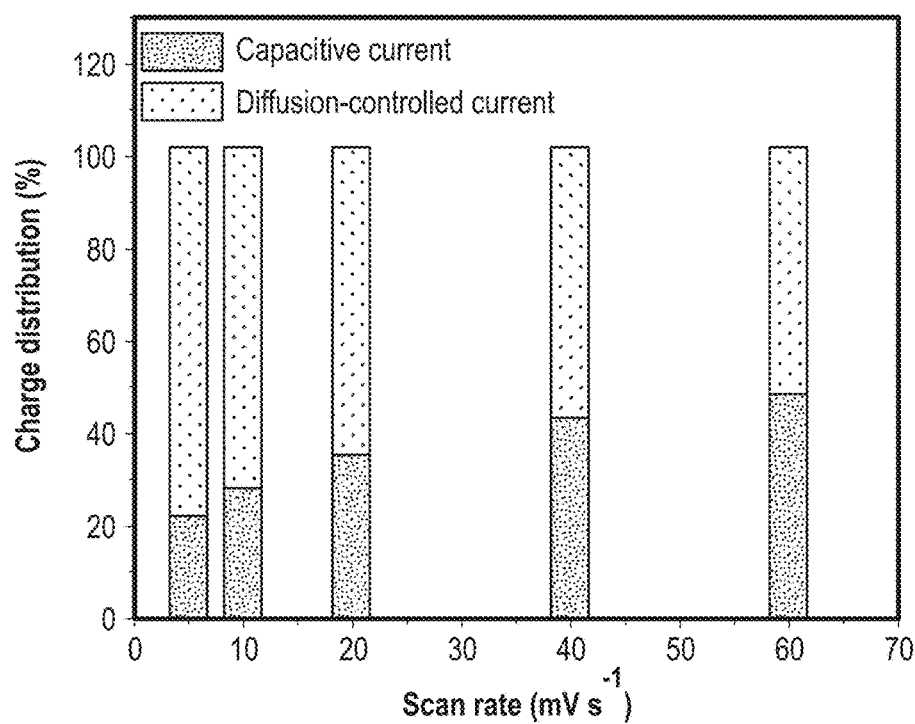
FIG. 4F shows a part of capacitive charge storage enlarges amid sweep rates, in accordance with the present invention.

As clearly seen from FIG. 4F, a part of capacitive charge storage enlarges amid sweep rates. At sweep rate of 5 mVs$^{-1}$, the fraction of the capacitive process is mainly 20%, representing the supremacy of the diffusion-controlled process of the Ni—Co$_4$N-2@NC electrode. The result obtained for Ni—Co$_4$N-2@NC is well in agreement with that of battery-type materials. The FIG. 6D shows separate charge storage parts at a sweep rate of 100 mVs$^{-1}$, wherein the inside shaded region signifies the diffusion-controlled contribution. Furthermore, GCD profiles of Ni—Co$_4$N-2@NC electrode at a varying current density ranging from 1 to 10 Ag–1 are depicted in FIG. 5A. The non-linear GCD profiles clearly suggest that the mainstream of energy storage is due to the faradaic process (electron transfer causes oxidation or reduction to occur). The specific capacity was evaluated from the GCD profiles and as illustrated in FIG. 5B. The maximum specific capacity of 397.5 mAhg$^{-1}$ was obtained at 1 Ag$^{-1}$. The electrode retained 72.4% of its preliminary capacity as the current density increased to 20 Ag$^{-1}$, indicating an outstanding rate capability of the Ni—Co$_4$N-2@NC electrode. The obtained specific capacity and rate performance is better to formerly reported TMNs based electrodes. The cycling stability is an important finding which determines the stability of electrodes and its practical effectiveness in supercapacitors. The cycling stability of the i-Co4N-2@NC electrode was explored by repeating 10,000 charging-discharging cycles at a current density of 15Ag$^{-1}$. The resulting graph of capacity retention with cycle number is depicted in FIG. 5C.

From the stability test, the Ni—Co$_4$N-2@NC electrode maintains 93% of its preliminary capacity over 10,000 cycles, and the capacity retention obtained for Ni—Co$_4$N-2@NC electrode is considerably superior to those of formerly reported metal nitride electrodes. Notably, the Coulombic efficiency of the electrode is very high (>98%), signifying the high reversibility of electrode during redox reactions. The schematics for the charge storage process of Ni—Co$_4$N@NC electrode in a KOH electrolyte is depicted in FIG. 5D. Additionally, to support the superiority of Ni—Co$_4$N-2@NC electrode, ex situ scanning electron microscope (SEM) and x-ray diffraction analysis (XRD) measurements were performed after cycling. The SEM image of Ni—Co4N@NC is provided in FIG. 7A. Nanorods with stacked nanoparticles-like morphology of the Ni—Co4N@NC were conserved very well, and the active material remains attached to the CC even repeated cycling, demonstrating the excellent cycling stability of the electrode. Moreover, the XRD pattern after cycling is shown in FIG. 7B. The peaks corresponding to Co$_4$N phase and metallic nickel exhibits reduced intensity with subsequent appearance of oxygenated species. The formation of oxygenated species and conversion of nitrides into oxides or hydroxides are seen to be prevalent processes during electrochemical process.

The excellent electrochemical activity of Ni—Co$_4$N-2@NC electrode is endorsed to various aspects such as the unique structural design and synergistic effect between different heteroatoms provide numerous electrochemically active sites and ion diffusion pathways, the free-standing design of Ni—Co$_4$N-2@NC nanoparticles arrays on the surface of CC minimizes the dead volume and resistance arising from the additives, thereby enhancing the conductivity and energy storage capacity of the electrode. Further, the vertically aligned nanoparticles composed nanorods provide lots of electroactive sites as well as superhighways for the electron transport and the development of nitrides recompense the electronic states of the Ni—Co$_4$N-2@NC electrode which enhances the conductivity and overall performance of the supercapacitors.

Considering electrochemical performance of hybrid solid-state supercapacitor (HSC) cells, hybrid-type of supercapacitors offer both high energy as well as high power. In order to illustrate the feasibility of the proposed Ni—Co$_4$N-2@NC electrode towards practical applications, hybrid supercapacitor cells are assembled by employing Ni—Co$_4$N-2@NC as a positive electrode and AC as a negative electrode with a PVA (poly vinyl alcohol)/KOH as the gel electrolyte. The schematics of the as constructed Ni—Co$_4$N-2@NC//AC HSC cells are illustrated in FIG. 6A. The comparative CV profiles of Ni—Co$_4$N-2@NC and AC electrodes recorded at an identical sweep rate of 100 mVs$^{-1}$ in their respective potential window are shown in FIG. 6B. Prior to the construction of HSC cells, charges between both the electrodes are balanced to get maximum electrochemical performance. Here, the mass ration between two electrodes is adjusted to 1:3.4 to obtained higher voltage window and energy storage capability for the HSC cells. In order to confirm a proper working voltage window for the as-constructed Ni—Co$_4$N-2@NC/AC HSC cells, CV and galvano-static charge-discharge (GCD) measurements are executed at different voltage windows. FIG. 8A demonstrates the CV profiles of Ni—Co$_4$N-2@NC/AC HSC cells recorded at voltage windows from 0 to 1.0 to 0-1.7 V at a fixed sweep rate of 100 mVs$^{-1}$. The appearance of redox pair in CV profiles at cathodic and anodic regions feature to the reversible redox reactions of active electrode materials. With an increase in cell voltage, related energy storage capacity also increases, and the HSC cells achieve a stable voltage window up to 1.6V without any distortion. Nevertheless, when the voltage extended to 1.7V, the CV profile shows slight polarization, and therefore, the optimized voltage window for HSC cells is determined to be 1.6 V. Likewise, GCD profiles recorded at different voltage windows demonstrate non-linear shapes with linear enhancement in both charge and discharge times amid voltage window (FIG. 8B). The specific capacitance calculated at different voltage windows is shown in FIG. 8C.

The PVA-KOH gel electrolyte was prepared according to the following procedure: Initially 6 g of PVA was dissolved in 30 ml of DI water under heating at 80° C. with continuous stirring until the formation of clear transparent solution. The gel solution was allowed to cool at ambient temperature naturally. Subsequently, 20 mL of 1 M KOH aqueous solution was dropped into the cooled gel solution under continuous stirring until the formation of transparent, viscous solution. To prepare solid-state device, firstly, the anode electrode was synthesized by mixing commercial activate carbon (AC), carbon black and PVDF in a mass ratio of 80:10:10. The slurry was prepared adding few drops of ethanol. Later the slurry was coated on Cu foam, which works as an anode, while the Cu$_3$N/Ni$_3$N electrode was directly applied as a cathode. The thin layer of PVA-KOH gel electrolyte was applied over both the electrodes and accumulated face to face through a mild griping and then covered with a parafilm.

The optimal mass ratio between the positive and negative electrode was obtained using the charge balance ($Q^+=Q^-$) denoted in equation:

$$\frac{m_+}{m_-} = \frac{C_- V_-}{C_+ V_+}$$

where, m, C and V are the mass, capacitance and the potential window for the positive and negative electrode. The calculated mass ration from the positive to negative electrode is 1:1.56. The specific capacitance ($C_{sc}$, F g$^{-1}$), specific energy (E, W h kg$^{-1}$), and specific power (P, W kg$^{-1}$) of the HSSC device were calculated using the following equations:

$$C_{SC} = \frac{I \times \Delta t}{m \times \Delta V} \quad E = \frac{0.5 \times C_{SC} \times \Delta V^2}{3.6} \text{ and } P = \frac{E \times 3600}{\Delta t}$$

The specific energy and specific power are two significant components used to appraise the electrochemical feature of SCs for its real-world application. The specific energy and specific power for the Ni—Co$_4$N-2@NC//AC HSC cells were explored from the capacitance of whole HSC cells. The HSC cells delivers a favourable specific energy of 57.2 Wh kg$^{-1}$ at a specific power of 843.8 W kg$^{-1}$ and maintained a specific energy of 32.8 Wh kg$^{-1}$ at high specific power of 8437.5 W kg$^{-1}$. The prepared HSC cell is capable to distribute together high energy with high power. Surprisingly, the high specific energy and power achieved for Ni—Co$_4$N-2@NC//AC HSC cell is significantly beyond to those of reported asymmetric and HSCs devices, for example Ni—NiWO$_4$//NiS/NS—C (43.68 W h kg at 0.85 kW kg$^{-1}$)[43] CoO@C//reduced graphene oxide (RGO) (43.99 Wh kg at 824.8 Wkg)[39], Ni$_3$N@RGO//DEG@RGO (50.5 Whkg$^{-1}$ at 800 W kg$^{-1}$)[44], NCF—N@FG//NF-3/500° C./CKK membrane//AC@NF (56.3 W h kg$^{-1}$ at 374.6 W kg$^{-1}$)[45], Zn—Co—Se//Graphene-ink (16.97 W h kg$^{-1}$ at 539.63 W kg$^{-1}$)[46], ZnO@C@NiO//Graphene (35.7 W h kg$^{-1}$ at 380.9 W kg$^{-1}$)[47]. The cycling stability of Ni—Co$_4$N-2@NC//AC HSC cell was measured at 5 A g$^{-1}$ current density for 15,000 non-stop charging-discharging cycles. The HSCs cell retained 89.7% of its preliminary capacity over 15,000 cycles, indicating the outstanding cycling stability.

The linear increase in capacitance and ~100% coulombic efficiency indicates the excellent energy storage performance and good reversibility between active electrodes. The rate capability is important for practical function of SCs to know its performance at each sweep rates, and in order to estimate the rate capability, CV and GCD tests were carried out at various sweep rates and current densities. The CV profiles for Ni—Co$_4$N-2@NC/AC HSC cells measured at sweep rates ranging from 5 to 150 mVs$^{-1}$ in a voltage range of 0-1.6 V, as presented in FIG. 8D. The CV profiles present almost identically outline representing that energy storage is facilitated by active electrode materials. Additionally, the redox peaks without any obvious distortion, representing a good reversibility of the HSC cells. There is always tread-off between the voltage window and the reversibility of the SCs cell. Typically, oxygen evolution reactions (OER) and corrosion reaction occur at higher voltage window and current density which will damage the reversibility and stability of the active electrodes. To prevent such consequences and reversibility of cell, a smaller potential window was chosen for the GCD measurements so that it can reach the boundary at a low current density as well. FIG. 6C reveals the GCD profiles for the Ni—Co4N-2@NC/AC HSC cells in a 0 to 1.5 V voltage range at different current densities. The GCD profiles are almost symmetric, that agrees well to the CV analysis. The specific capacitance for the HSC cells is evaluated from GCD profiles and presented in FIG. 6D.

In another embodiment of the present invention, the HSC cells achieved highest specific capacitance of 183 $Fg^{-1}$ at 1 $Ag^{-1}$ and further maintained to 105 $Fg^{-1}$ at 10 $Ag^{-1}$, respectively. Notably, Ni—Co$_4$N-2@NC/AC HSC cells achieved rate capability of 57.4%. The specific energy and specific power are two significant components used to appraise the electrochemical feature of supercapacitors for its real-world application. The specific energy and specific power for the Ni—Co$_4$N-2@NC/AC HSC cells were explored from the capacitance of whole HSC cells and presented as the Ragone plot in FIG. 7A. The HSC cells deliver a favorable specific energy of 57.2 W h $kg^{-1}$ at a specific power of 843.8 W $kg^{-1}$ and maintain a specific energy of 32.8 W h $kg^{-1}$ at a high specific power of 8437.5 W $kg^{-1}$. It is interesting to note that the prepared HSC cell is capable to distribute together high energy with high power. Surprisingly, the high specific energy and power achieved for Ni—Co$_4$N-2@NC/AC HSC cells is significantly beyond to those of reported asymmetric and HSC devices, for example Ni—NiWO$_4$//NiS/NS—C (43.68 W h kg at 0.85 kW $kg^{-1}$), CoO@C//reduced graphene oxide (RGO) (43.99 W h kg at 824.8 W kg), Ni3N@RGO// DEG@RGO (50.5 W h $kg^{-1}$ at 800 W $kg^{-1}$), NCF—N@FG//NF-3/500° C./CKK membrane//AC@NF (56.3 W h $kg^{-1}$ at 374.6 W $kg^{-1}$), Zn—Co—Se//Graphene-ink (16.97 W h $kg^{-1}$ at 539.63 W $kg^{-1}$), ZnO@C@NiO//Graphene (35.7 W h $kg^{-1}$ at 380.9 W $kg^{-1}$).

Furthermore, EIS analysis performed for Ni—Co4N-2@NC//AC HSC cells exhibits the very low $R_s$ of 1.31 $\Omega cm^{-2}$ with small $R_{ct}$ of 0.07 $\Omega cm^{-2}$, representing the fast reaction kinetics between active electrode and electrolyte (FIG. 7B). Notably, the lower resistance value also indicates good compatibility between active electrodes and PVA/KOH gel electrolyte. It is always preferred that the energy storage devices must possess ultra-high cycling stability in aid of its better application. Therefore, the cycling stability of Ni—Co4N-2@NC//AC HSC cells was measured at 5 A $g^{-1}$ current density for 15,000 non-stop charging-discharging cycles. The HSCs cell retained 89.7% of its preliminary capacity over 15,000 cycles (FIG. 7C), indicating an outstanding cycling stability. The superior supercapacitor performance for the Ni—Co$_4$N-2@NC//AC HSC cells indicate its potential application for the expansion of efficient and stable devices for energy storage systems. The overall results suggest that the metal-metal nitride hetero-structures offer excellent electrochemical performance and high electrical conductivity. These outcomes propose state-of-art information on systematic synthesis technique and endorse the transition metal-metal nitride hetero-structures as an advanced electrode materials.

In another embodiment of the present invention, the present approach may be upgraded for different nanomaterials and their commercialization for advanced energy storage devices. The invention discloses novel self-supported hetero-atomic electrode composed of Ni—Co$_4$N@NC stacked-nanoparticles confined in highly conductive nitrogen-doped carbon (NC) matrix through in-situ nitridation for high energy and stable HSCs. The integral design of stacked nanoparticles anchored on highly conductive nitrogen-doped carbon substrate offers fast charge transport as well as increases the exposed surface-active sites. With high electrical conductivity and heteroatom structure benefits, the resulting Ni—Co$_4$N@NC electrode yields a maximum specific capacity of 397.5 mA h $g^{-1}$ at current density of 1 A $g^{-1}$ with a superb rate capability of 72.4% and better cycling stability after 10,000 charge-discharge cycles. Also, the proposed HSC cells are constructed using Ni—Co$_4$N-2@NC and AC electrodes. The resultant HSC cells demonstrate excellent electrochemical performance bringing a specific energy of 57.2 Wh $kg^{-1}$ at a specific power of 843.8 W $kg^{-1}$ and long-term cycling stability after 15,000 cycles with capacity retention of 89.7%.

In the search of clean and highly efficient energy storage systems, hybrid supercapacitors (HSCs) are one of the best choices owing to their ultrahigh power densities along with stable cycling performance, cost-effectiveness, high efficiency and being environment friendly. However, the surface controlled electrochemical reactions of the supercapacitors restricts the charge transfer process on or near surface leading to relatively inferior energy storing capacity than the present Li-ion batteries (LIBs), which hampers their leading role in practical devices. Hybrid design of supercapacitors assembled with the redox active positive electrode and carbon composed negative electrode can be able to tackle the low energy density limit exclusive of surrendering power density and cycle life. Hence, it is necessary to design and develop novel redox active positive electrode materials to fabricate the HSCs with high energy density. In the present invention, nitridation-induced in situ coupling of novel, highly-efficient Ni—Co$_4$N nanoparticles entrenched in N-doped carbon (NC) matrix is successfully developed via a facile pyrolysis of layered Ni—Co hydroxide decorated on PANI/CC. The Ni—Co$_4$N@NC material is effectively used as a redox active material for supercapacitor cathode electrode.

The in-situ growth of cathode electrode (Ni—Co$_4$N@NC nanoparticles on carbon cloth has several advantages, such as the presence of interstitial nitrogen in the electronic structure of cobalt unit cell facilitates quick electron transfer and thereby offers high electrical conductivity, high intrinsic activity, and stable performance. Further, the carbon atoms from the carbon matrix are replaced with the doped N atoms and the charge transfer takes place between adjacent carbon atoms and doped N atoms, which enhances the conductivity and create more active sites for electrochemical activity of the electrode. Further, availability of plenty of rendering electrochemically active sites, specifically, single-atom Ni, Co$_4$N nanoparticles, and hetero-atomic N-doped carbon matrix, and their several synergistic effects facilitate fast electron transfer and provide abundant electroactive sites for rapid redox reactions. The free-standing design of Ni—Co$_4$N-2@NC nanoparticles arrays on the surface of CC minimizes the dead volume and resistance arising from the additives, thereby enhancing the conductivity and energy storage capacity of the electrode. The vertically aligned nanoparticles composed nanorods provide lots of electroactive sites as well as superhighways for the electron transport. As a result, excellent electrochemical properties are obtained, such as specific capacities of 397.5 mA h $g^{-1}$ at 1

A g$^{-1}$ and high-rate capability of 72.4% and a remarkable cycling stability of 93% over 10000 cycles and Coulombic efficiency (>98%).

In addition, for the first time, heteroatomic Ni—Co$_4$N nanoparticles are laminated on highly conductive nitrogen-doped carbon (NC) matrix on carbon cloth through in-situ nitridation. Nitridation is one of the best effective processes to prepare specific metal nitrides for various applications. This method has several advantages, such as PANI nanowires are grown on CC substrate through the simple polymerization of aniline in a chilled environment. The PANI afford additional NH$_3$ gas throughout pyrolysis as well as resulting in the formation of N-doped carbon matrix between active material and CC substrate. Further, the process is very simple, cost-effective compared with other methods and can be used for large area deposition. As another aspect of the present invention, a hybrid supercapacitor (HSC) cell is fabricated using the heteroatomic Ni—Co$_4$N@NC electrode beside the activated carbon (AC) electrode. The fabricated HSC cell is found to exhibit excellent performance features such as large operating potential window of 1.5 V, amazing specific energy of 57.2 Wh kg$^{-1}$ at a specific power of 843.8 W kg$^{-1}$ and a superior cycling stability of 89.7% after 15,000 cycles with 100% of columbic efficiency.

In another embodiment of the present invention, a hybrid super-capacitor (HSC) cell generated with the hetero-atomic NiCo$_4$N@NC nanoparticles on Ni foam is used as positive material and activated carbon as negative electrode, and the resultant HSC cell has the following performance features such as a large operating potential window, high specific energy at a given specific power and a superior cycling stability with 100% columbic efficiency. The obtained results are classified into two categories namely, the fabrication of self-supported hetero-atomic electrode composed of Ni—Co$_4$N@NC stacked-nanoparticles confined in highly conductive nitrogen-doped carbon (NC) matrix through in-situ nitridation and the construction of a HSC cell based on the Ni—Co$_4$N@NC nanoparticles on Ni foam and AC electrodes.

The surface morphology of prepared samples was analyzed using a field emission scanning electron microscopy (FESEM, JEOL-7800F) and a transmission electron microscopy (TEM, JEOL JEM-2010). The structural analysis of the prepared samples were performed by the X-ray diffraction (XRD) analysis (Rigaku diffractometer (Maxima XRD-7000) using Cu K alpha radiation ($\lambda$=1.5406 A.U.)). The oxidation states of the elements present in the prepared sample were investigated by X-ray photo-electron spectrometry (XPS) measurements (XPS, Thermo Scientific Inc. UK with monochromatic Al K$\alpha$ X-rays). The electrochemical performances were measured using a electrochemical workstation (ZIVE SP2) in a typical three-electrode setup. For the three-electrode configuration, prepared materials were directly used as working electrodes (1 cm$^2$), platinum wire was used as counter electrode, Hg/HgO was used as reference electrode and 1 M KOH aqueous solution as an electrolyte. The electrochemical performances were tested using cyclic voltammetry (CV) and galvanostatic charge-discharge (GCD) measurements recorded at different scan rates and current densities, respectively. The electrochemical impedance spectroscopy (EIS) analysis was performed at frequency ranges from 100 kHz to 0.01 Hz at applied voltage of 10 mV.

The specific capacity ($Q_s$) and areal capacitance ($C_A$) were calculated from the discharge curve using the following formulae: $Q_s=(I\times\Delta t)/(m\times 3.6)$ and $C_A=(I\times\Delta t)/(A\times\Delta V)$, where, I (A) represents the discharge current density, $\Delta t$ (s) represents the discharge time, m (g) is the mass of active material, $\Delta V$ is the voltage window and A (cm$^2$) is the area of active electrode material.

Hybrid design of supercapacitors includes redox active positive electrode assembled with carbon composed negative electrode, which gives high energy density, facile pyrolysis of layered Ni—Co hydroxide decorated on PANI/CC produces Ni—Co$_4$N nanoparticles entrenched in N-doped carbon (NC) matrix (NiCo$_4$N@NC) and nitrogenous gases released from pyrolysis of PANI used to encourage in situ conversion of Ni—Co hydroxide@PANI to Ni—Co$_4$N@NC. N-doped carbon derived on CC forms a stable, highly conductive interconnected network and the resultant NiCo$_4$N@NC electrode has high electrochemical performance for supercapacitors. NiCo$_4$N@NC is used as a redox active material for the supercapacitor cathode (cathode electrode being NiCo$_4$N@NC nanoparticles on carbon cloth). The hybrid super-capacitor (HSC) cell generated with the hetero-atomic NiCo$_4$N@NC nanoparticles on Ni foam used as positive material and activated carbon as negative electrode. The plenty of rendering electrochemically active sites, specifically, single-atom Ni, Co$_4$N nanoparticles, and hetero-atomic N-doped carbon matrix, and their several synergistic effects facilitate fast electron transfer and superior electrochemical performance. The free-standing design of Ni—Co$_4$N-2@NC nanoparticles arrays on the surface of CC minimizes the dead volume and resistance arising from the additives, thereby enhancing the conductivity and energy storage capacity of the electrode. The vertically aligned nanoparticles composed nanorods provide lots of electroactive sites as well as superhighways for the electron transport, and the development of nitrides recompenses the electronic states of Ni—Co$_4$N-2@NC electrode which enhances the conductivity and overall supercapacitor performance.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A process of producing a hybrid super-capacitor (HSC) electrode, the process comprising:
   performing nitridation-induced in situ coupling of Ni—Co$_4$N nanoparticles in an N-doped carbon matrix, wherein the resultant hybrid super-capacitor (HSC) electrode is a Ni—Co$_4$N@NC electrode,
   wherein the nitridation-induced in situ coupling is performed via a facile pyrolysis of layered Ni—Co hydroxide decorated on polyaniline (PANI) nanotubes on the basis of a carbon cloth (CC).

2. The process of claim 1, wherein the resultant hybrid super-capacitor (HSC) electrode is a self-supported metal nitride coordinated with N-doped carbon.

3. The process of claim 1, wherein nitrogenous gases released from the facile pyrolysis of polyaniline (PANI) nanotubes are used for the in-situ conversion of NiCo@PANI to Ni—Co$_4$N@NC.

4. The process of claim 1, wherein the produced hybrid super-capacitor (HSC) electrode is constructed with Ni—Co$_4$N@NC and activated carbon (AC) as cathode and anode of the produced hybrid super-capacitor (HSC) electrode.

5. The process of claim 4, wherein the cathode and anode demonstrate a specific energy of 57.2 Wh kg$^{-1}$ at a specific power of 843.8 W kg$^{-1}$ and capacity retention of 89.7% after 15,000 cycles.

6. The process of claim 1, wherein synthesis of polyaniline (PANI) on carbon cloth (PANI/CC) is conducted through steps comprising:
   using ammonium persulfate to polymerize aniline to form PANI on carbon cloth (CC);
   immersing clean CC in a 50 mL of mixture solution of 1 M $H_2SO_4$ and 0.55 mL aniline placed in an ice bath under magnetic stirring;
   adding 50 mL of 1 M $H_2SO_4$ containing 0.545 g ammonium persulfate dropwise to the mixture solution forming a reaction mixture; and
   placing the reaction mixture in the ice bath.

7. The process of claim 6, wherein the reaction mixture is placed in the ice bath for 5 hours, and a subsequently obtained green color PANI deposited CC is washed with de-ionized (DI) water and acetone and dried overnight at 60° prior to further use.

8. The process of claim 1, wherein preparation of Ni—$Co_4$N@NC nanoparticles arrays on CC comprises the steps of:
   growing PANI nanowires on a carbon cloth (CC) substrate through polymerization of aniline in a chilled environment resulting in PANI coated CC;
   growing NiCo precursor nanosheets on the PANI coated CC under a hydrothermal process, and calcinating the PANI coated CC in a tubular furnace under Ar/NH3 environment at 700° C.

9. The process of claim 8, wherein formation of metal nitrides from the NiCo precursor nanosheets takes place inside the tubular furnace.

10. The process of claim 8, wherein an SEM image of the prepared Ni—$Co_4$N@NC nanoparticles arrays on CC reveals that the NiCo precursor nanosheets are assembled into uniformly oriented free-standing 1D nanorods and are perpendicularly anchored on the CC substrate, forming hierarchical arrays.

* * * * *